US006816830B1

(12) United States Patent
Kempe

(10) Patent No.: US 6,816,830 B1
(45) Date of Patent: Nov. 9, 2004

(54) FINITE STATE DATA STRUCTURES WITH PATHS REPRESENTING PAIRED STRINGS OF TAGS AND TAG COMBINATIONS

(75) Inventor: Andre Kempe, Biviers (FR)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/419,435

(22) Filed: Oct. 15, 1999

Related U.S. Application Data

(63) Continuation of application No. PCT/EP98/04153, filed on Jul. 6, 1998.

(30) Foreign Application Priority Data

| Jul. 4, 1997 | (DE) | ............................................. 9714 126 |
| Jan. 14, 1998 | (GB) | ............................................. 9800791 |

(51) Int. Cl.[7] .......................... G06F 17/27; G10L 15/00
(52) U.S. Cl. .......................................... 704/9; 704/257
(58) Field of Search .......................... 704/9, 10, 1, 256, 704/257, 255

(56) References Cited

U.S. PATENT DOCUMENTS

| 5,610,812 | A | | 3/1997 | Schabes et al. .............. 395/759 |
| 5,721,939 | A | * | 2/1998 | Kaplan ............................ 704/9 |
| 5,806,032 | A | * | 9/1998 | Sproat et al. ................ 704/255 |
| 5,890,103 | A | * | 3/1999 | Carus ............................. 704/9 |
| 6,182,029 | B1 | * | 1/2001 | Friedman ........................ 704/9 |

FOREIGN PATENT DOCUMENTS

| WO | WO 99/01828 | 1/1999 |

OTHER PUBLICATIONS

Kempe, A., "Finite State Transducers Approximating Hidden Markov Models", Proceedings of the 35th Annual Meeting of The Association for Computational Linguistics, Jul. 1997, Madrid, Spain, pp. 460–467, XP002085043.

Kempe, A., "Look–Back and Look–Ahead in the Conversion of Hidden Markov Models into Finite State Transducers", Proceedings of the Joint Conference on New Methods in Language Processing and Computational Natural Language Learning, Jan. 1998, Sydney Australia, pp. 29–37, XP002085044.

Charniak, E., "Statistical Techniques for Natural Language Parsing", American Association Artificial Intelligence Magazine, Winter 1997, Vol. 18, No. 4, pp. 33–44, XP002085045.

(List continued on next page.)

*Primary Examiner*—Patrick N. Edouard
(74) *Attorney, Agent, or Firm*—Oliff & Berridge, PLC; Eugene Palazzo

(57) ABSTRACT

A finite state data structure includes paths that represent pairs of strings, with a first string that is a string of tag combinations and a second string that is a string of tags for tokens in a language. The second strings of a set of paths with the same first string include only highly probable strings of tags for the first string. The data structure can be an FST or a bimachine, and can be used for mapping strings of tag combinations to strings of tags. The tags can, for example, indicate parts of speech of words, and the tag combinations can be ambiguity classes or, in a bimachine, reduced ambiguity classes. An FST can be obtained by approximating a Hidden Markov Model. A bimachine can include left-to-right and right-to-left sequential FSTs obtained based on frequencies of tokens in a training corpus.

20 Claims, 17 Drawing Sheets

OTHER PUBLICATIONS

Pereira et al., "Weighted Rational Transductions and their Application to Human Language Processing", Proceedings of Human Language Technology workshop, Jan. 1994, pp. 262–267, XP000571116.

Tapanainen et al., "Syntactic Analysis of Natural Language Using Linguistic Rules and Corpus–Based Patterns", Proceedings of the 15$^{th}$ International Conference on Computational Linguistics (COLING94), 1994, Kyoto, Japan, pp. 629–634, XP002085046.

Roche et al., "Deterministic Part–of–Speech Tagging with Finite–State Transducers", Computational Linguistics, Jun. 1995, vol. 21, No. 2, pp. 227–253, XP002085047.

Kaplan et al., "Regular Models of Phonological Rule Systems", Computational Linguistics, Sep. 1994, vol. 20, No. 3, pp. 331–378, XP000569407.

Rabiner, "A Tutorial on Hidden Markov Models and Selected Applications in Speech Recognition", Proceedings of the IEEE, Feb. 1989, USA, vol. 77, No. 2, pp. 257–286, XP002085048.

Chanod et al., "Tagging French–comparing a statistical and a constraint–based method", Proceedings of the 7$^{th}$ Conference of the EACL, Dublin, Ireland, ACL, 1995, pp. 149–156.

Bahl et al., "Part of Speech Assignment by a Statistical Decision Algorithm" Proceedings of IEEE International Symposium on Information Theory, Jun. 21–24, 1976, Ronneby, Sweden, pp. 88–89.

Church, "A Stochastic Parts Program and Noun Phrase Parser for Unrestricted Text" Proceedings of the 2$^{nd}$ Conference on Applied Natural Language Processing, ACL, 1988, pp. 136–143.

Schützenberger, "A Remark on Finite Transducers", Information and Control, vol. 4, 1961, pp. 185–196.

Roche et al., "Introduction", "Finite–State Language Processing", Cambridge, Mass., MIT Press, 1997, pp.1–65.

* cited by examiner

| | | |
|---|---|---|
| The | [AT] | AT |
| share | [NN,VB] | NN |
| of | [IN] | IN |
| the | [AT] | AT |
| new | [JJ,RB] | JJ |
| housing | [NN,VBG] | NN |
| market | [NN,VB] | NN |
| enjoyed | [VBD,VBN] | VBD |
| by | [IN,RB] | IN |
| apartments | [NNS] | NNS |
| has | [HVZ] | HVZ |
| more | [AP,RB] | RB |
| than | [CS,IN] | CS |
| tripled | [VBD,VBN] | VBD |
| within | [IN,RB] | IN |
| that | [CS,DT,WPS] | DT |
| span | [NN,VB,VBD] | VBD |
| of | [IN] | IN |
| time | [NN,VB] | NN |
| | [SENT] | SENT |

FIG. 13

| | LEFT-TO-RIGHT MAPPING | RIGHT-TO-LEFT MAPPING | |
|---|---|---|---|
| When | [WRB]_D | [WRB]_R_1 | WRB |
| he | [PPS]_D | [PPS]_R_1 | PPS |
| left | [JJ NN RB VBD VBN]_2 | [RB VBD]_R_8 | VBD |
| his | [PP$]_D | [PP$]_R_1 | PP$ |
| house | [NN VB]_2 | [NN]_R_1 | NN |
| to | [IN TO]_1 | [IN TO]_R_1 | TO |
| catch | [NN VB]_5 | [NN VB]_R_5 | VB |
| the | [AT]_D | [AT]_R_1 | AT |
| bus | [NN VB]_2 | [NN]_R_1 | NN |
| to | [IN TO]_1 | [IN TO]_R_1 | IN |
| Xyz | [UNKNOWN]_D | [JJ NN NNS NP VB]_R_1 | NP |
| , | [CM]_D | [CM]_R_1 | CM |
| he | [PPS]_D | [PPS]_R_1 | PPS |
| fell | [JJ NN RB VB VBD]_1 | [RB VBD]_R_3 | VBD |
| down | [IN JJ NN RB VB]_3 | [IN JJ NN RB]_R_2 | IN |
| the | [AT]_D | [AT]_R_1 | AT |
| stairs | [NNS]_D | [NNS]_R_1 | NNS |
| | [SENT]_D | [SENT]_R_1 | SENT |

FIG. 15

FINITE STATE DATA STRUCTURES WITH PATHS REPRESENTING PAIRED STRINGS OF TAGS AND TAG COMBINATIONS

This application is a continuation claims priority under 35 U.S.C. §120 from copending International Application PCT/EP98/04153, filed Jul. 6, 1998, with respect to all shared subject matter. International Application PCT/EP98/04153 in turn claimed priority from Great Britain Application No. 9714126.1, filed Jul. 4, 1997, and Great Britain Application No. 9800791.7, filed Jan. 14, 1998.

FIELD OF THE INVENTION

The invention relates to finite state data structures in which paths represent paired strings of tags and tag combinations.

BACKGROUND

Techniques are well known for performing part-of-speech tagging of machine-readable text by automatically obtaining tags for words in a sentence or other text segment or corpus. Each tag can identify a word's part-of-speech (e.g. noun-singular, verb-present-1st person plural, etc.). Such tags typically have a standardized form, such as the form specified under the Text Encoding Initiative (TEI), described at the Web site of the TEI Consortium, http://www.tei-c.org/. The tags for a text segment or corpus can be used, for example, in information retrieval from the text and statistical analysis of the text.

Schabes et al., U.S. Pat. No. 5,610,812, describe a contextual tagger that uses a deterministic finite state transducer (FST) to improve tagging speed. The contextual tagger is constructed by examining a training corpus of tagged text to acquire a set of rules and by then transforming the rules into a deterministic FST using non-deterministic transducers, a composer, and a determinizer. To tag an input sentence, the sentence is initially tagged by assigning to each word its most likely part-of-speech tag regardless of surrounding words, and the deterministic FST is then applied to the resulting sequence of part-of-speech tags using the surrounding words to obtain final part of speech tags. In other words, the deterministic FST is applied to the initial sequence of tags to obtain the final sequence of tags.

Charniak, E., "Statistical Techniques for Natural Language Parsing", *AI Magazine,* Winter 1997, pp. 33–43 describes techniques that use probabilistic Hidden Markov Model (HMM) based taggers. Charniak describes an HMM as a finite automaton in which the state transitions have probabilities and whose output is also probabilistic, and shows a fragment of an HMM for tagging in which each state is labelled with a part of speech, in which state-to-state transitions have probabilities, and in which output words for a state also have probabilities. Such taggers select, from among the part-of-speech tags that are found for a word in the dictionary, the most probable tag based on the word's context, i.e. based on the adjacent words.

Chanod, J.-P., and Tapanainen, P., "Tagging French—Comparing a Statistical and a Constraint Based Method", in *Proceedings of the 7th Conference of the EACL,* Dublin, Ireland, ACL, 1995, pp. 149–156, compare a statistical approach with a constraint-based approach to part-of-speech tagging. Both approaches tokenize with an FST to obtain words and perform morphological analysis with a transducer lexicon to obtain a set of part-of-speech tags for each word. The statistical approach then disambiguates the sets of tags using an HMM, which can be thought of as encoding a relation between two languages, one including sequences of ambiguity classes and the other including sequences of tags. In contrast, the constraint-based approach disambiguates the sets of tags with FSTs derived from a set of rules written by linguists. It is well known that such an FST may be non-deterministic, i.e. for an input sentence it may provide more than one solution or no solutions at all.

SUMMARY OF THE INVENTION

The invention addresses problems that arise with conventional automatic tagging techniques.

Some conventional techniques use each word in a sequence to obtain a most probable tag, as exemplified by the initial tagger described by Schabes et al. Such techniques produce many tagging errors, however, because a word that has several possible tags will often occur with tags other than its most probable tag. Other conventional techniques attempt to correct tagging errors based on context, as exemplified by the contextual tagger of Schabes et al. Still other conventional techniques, exemplified by the HMM-based taggers of Charniak and by the statistical and constraint-based taggers of Chanod and Tapanainen, reduce tagging errors by obtaining one of a word's possible tags based in part on adjacent words.

In general, conventional techniques are subject to a tension between accuracy and speed that limits performance. HMM-based taggers, for example, can be very accurate but are relatively slow in comparison with FST taggers; for example, an HMM-based tagger implemented as an FST modified to include weights on transitions is slower than an FST without weights because significant additional computation is necessary to use the weights. On the other hand, conventional FST taggers are generally less accurate than HMM taggers. Conventional FST tagging techniques that employ an FST automatically derived from a hand-tagged corpus seem to reach a limit of accuracy beyond which improvement can only be obtained by time-consuming additional measures to correct errors. Conventional FST tagging techniques that employ an FST derived from manually written constraints can achieve greater accuracy but require a great deal of work to write the constraints.

The invention alleviates the tension between speed and accuracy with new techniques that can be used to provide fast, accurate tagging. The techniques can be understood by considering that conventional disambiguators like those described by Chanod and Tapanainen, above, behave like a sequential transducer that deterministically maps a sequence of ambiguity classes (corresponding, for example, to a sentence) into a unique sequence of tags, e.g.:

| [DET] | [ADJ, NOUN] | [ADJ, NOUN] | ... | [END] |
|-------|-------------|-------------|-----|-------|
| DET   | ADJ         | NOUN        | ... | END   |

Each technique provided by the invention involves a finite state data structure (FSDS) that can be used to map strings of tag combinations to strings of tags for tokens in a language. Each tag combination can be a logical combination of tags, such as an ambiguity class which is a conjunction of a set of tags. The FSDS can include paths representing pairs of strings. A first string in a pair can be a string of tag combinations, while a second can be a string of tags. The second strings of a set of paths with the same first string can include only highly probable strings of tags for the first string. A path can be machine accessible using its first string to obtain its second string.

The new techniques can thus be used to perform finite state tagging in two stages: A first stage uses tokens in a text to obtain a string of tag combinations, such as for a sentence or other string of tokens. A second stage uses the string of tag combinations to obtain a string of tags. If the string of tag combinations is the first string of a set of paths as described above, the string of tags is a highly probable disambiguation of the string of tag combinations.

Because the FSDS can be an FST, it is not surprising that the new techniques permit tagging at speeds comparable to conventional FST tagging. But it is surprising that the new techniques provide tagging with a significantly improved combination of speed and accuracy, approaching the accuracy of HMM taggers.

The new techniques can be implemented in an article of manufacture that includes an FSDS as described above, in a machine that includes such an FSDS, and in methods for using and transferring such an FSDS.

The FSDS can, for example, be an FST or it can be a bimachine that includes two FSTs. In either case, the first and second strings of a pair of strings represented by a path in the FSDS can be of equal length, with each tag combination in the first string having a counterpart tag in the second string. At least one tag combination in the first string can include two or more tags, and the counterpart tag in the second string can be one of the tags in the tag combination. The tags can be part-of-speech tags, so that each tag combination includes one or more parts of speech.

An FST as described above can be produced in several different ways. Some ways obtain a set that includes possible tags for tokens in the language and another set that includes tag combinations, then use the two sets to produce an FST. Other ways obtain a first partial set of tag combination sequences ending with a tag combination with only one tag, then obtain a second partial set of combination-tag pair sequences in which the tag combinations in each sequence in the first partial set are paired with tags, and then use the second partial set to produce an FST.

Some ways produce FSTs that approximate a Hidden Markov Model (HMM) used for part-of-speech tagging. For example, the FST can be (a) an "n-type" approximation of an HMM, which is a simple FST that can be applicable in all cases, and can be derived from HMM probability matrices; (b) an "s-type" approximation of an HMM, which is a precise HMM-approximating transducer for selected cases taken from a training corpus; (c) a completed precise s-type transducer, completed for example with sequences from a simple n-type transducer, to make the precise transducer applicable in all cases; or (d) a "b-type" approximation of an HMM, which is an HMM-approximating transducer that can have variable precision and can be applicable in all cases.

A bimachine as described above can include two FSTs, a first FST for mapping from strings of complete tag combinations to strings of partial tag combinations and a second FST for mapping from strings of partial tag combinations to strings of tags. The second FST, considered separately, is thus an FST as described above, and the bimachine itself is also an FSDS as described above.

The new techniques can be implemented in a method of tagging a text using an FSDS as described above.

The new techniques can also be implemented in a system that includes an FSDS as described above and a processor that accesses the FSDS to perform tagging. The new techniques can also be implemented in a method for transferring an FSDS as described above from one machine to another machine.

Compared with HMM taggers of approximately the same accuracy, an advantage of the new techniques is that they permit tagging speeds up to ten times higher than when using the HMM taggers. An important reason for this is that, in selecting highly probable tags, conventional HMM tagging techniques perform complex computations using probabilities or weights for transitions. In contrast, the new techniques make it possible to obtain a highly probable string of tags directly from a finite state data structure without performing computations using weights.

Another advantage of the new techniques is that, unlike conventional HMM taggers, FSDSs can be integrated with tools that perform further steps of text analysis. An FST, for example, can be handled by the finite state calculus and therefore directly integrated into other finite-state text processing tools, such as those available from Xerox Corporation and elsewhere. Since the tagger is often in the middle of a chain of text analysis tools where all the other tools may be finite-state-based (which can be the case with text processing tools available from Xerox Corporation), performing tagging with an FST or other FSDS rather than with an HMM tagger can make this chain homogeneous, thus making it possible to merge the chain's components into one single FST, by means of composition.

Implementations of the new techniques that approximate an HMM are further advantageous because, in comparison with tagging techniques that employ an FST automatically derived from a hand-tagged corpus, the new techniques can obtain an FST automatically from an untagged corpus: First an HMM can be trained on the untagged corpus; then, an FST can be automatically obtained from the HMM.

In addition, the new techniques have applications other than tagging, such as in speech recognition.

Bimachine implementations of the new techniques are further advantageous because, in comparison with HMM taggers and with single FSTs, the bimachine data structures require significantly less memory.

The following description, the drawings, and the claims further set forth these and other aspects, objects, features, and advantages of the invention.

BRIEF DESCRIPTION OF THE DRAWINGS

FIG. 13 is a schematic illustration of the tagging of a sentence using an FST.

FIG. 15 is a schematic illustration of the tagging of a sentence using a bimachine.

DETAILED DESCRIPTION

A. Conceptual Framework

Figure 1:
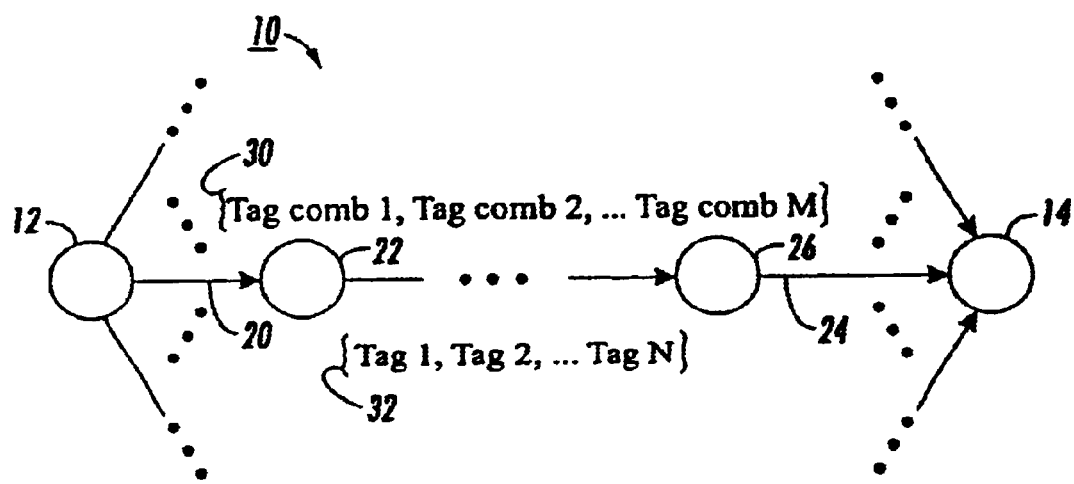
FIG. 1 is a schematic diagram showing a path in a finite state data structure that is machine accessible with a string of tag combinations to obtain a string of tags that is a highly probable disambiguation of the string of tag combinations.

The following definitions are helpful in understanding the broad scope of the invention, and the terms defined below have the indicated meanings throughout this application, including the claims.

As used herein, the notions of "word" and "separator" or "break" are closely related: A "separator" or "break" (or "word separator" or "word break") is a string of one or more elements that meets a criterion for separating words (a "break criterion"), while a "word" is a string of one or more elements, each of which is a character or a combination of characters, where the string does not include an internal separator according to the applicable break criterion. Break criteria applicable to languages such as French and English often treat strings of one or more spaces as word separators. In addition to correctly spelled words, abbreviations, acronyms, contractions, misspellings and nonsense words, mathematical and logical expressions including formulas and equations, combinations of one or more punctuation marks that do not meet a break criterion (such as dotted lines, signature lines, "smileys", etc.), and various other types of strings of characters, whether or not semantically meaningful, can all be words under this definition if they do not include internal separators under an applicable criterion. To differentiate this meaning from the sense in which a word must be a semantic unit, words obtained by applying a break criterion are sometimes referred to herein as "tokens".

A "text" is a series of characters that forms a series of words (or tokens) separated by word separators. A text may be "defined", for example, by a written or printed series of characters or by an item of data that includes a series of character codes.

A "tag" is an item of data that identifies a category applicable to tokens. For example, a tag can indicate the part of speech of words in a language.

A "tag combination" is a logical combination of tags. An example of a tag combination is an ambiguity class which is a conjunction of a set of tags that a token could have.

A string of tags is a "highly probable disambiguation" of a string of tag combinations in a language if, over a number of occurrences of the string of tag combinations in text in the language, a high proportion of the occurrences are correctly disambiguated as the string of tags. Any appropriate criterion can be used to determine what is a high proportion; for example, the highly probable disambiguations of a specific string could be defined as the smallest number of disambiguations whose probabilities together total at least 0.5 or another appropriate value.

Where a first string is a string of tag combinations and a second string is a string of tags, the second string is a "highly probable string of tags" for the first string if the second string is a highly probable disambiguation of the first string.

A finite state automaton (FSA) is a data processing system having a finite number of states and transitions (or arcs), each transition originating in a "source state" and leading to a "destination state", and in which each transition has one or more associated values. As a result, an FSA can respond to an input signal indicating a value by following a transition with a matching value.

A finite state transducer (FST) is an FSA in which each transition has associated values on more than one level. As a result, an FST can respond to an input signal indicating a value on one of the levels by following a transition with a matching value on the level and by providing as output the transition's associated value at another level. A two-level transducer, for example, can be used to map between input and output strings.

The term "finite state data structure" is used herein to mean a data structure containing information sufficient to define the states and transitions of at least one FSA or FST. A data structure defining a bimachine is an example of a finite state data structure, whether implemented as two FSTs or in another way.

Information in a finite state data structure can be analyzed in terms of "paths" and "acceptable strings", where each path in the finite state data structure "represents" one or more acceptable strings. A path includes a sequence of states and transitions that indicate a sequence of criteria that are satisfied, in sequence, by the elements of each acceptable string the path represents. States at which paths begin may be called "start states" or "initial states" and states at which paths end may be called "final states".

B. General Features

Figure 2:
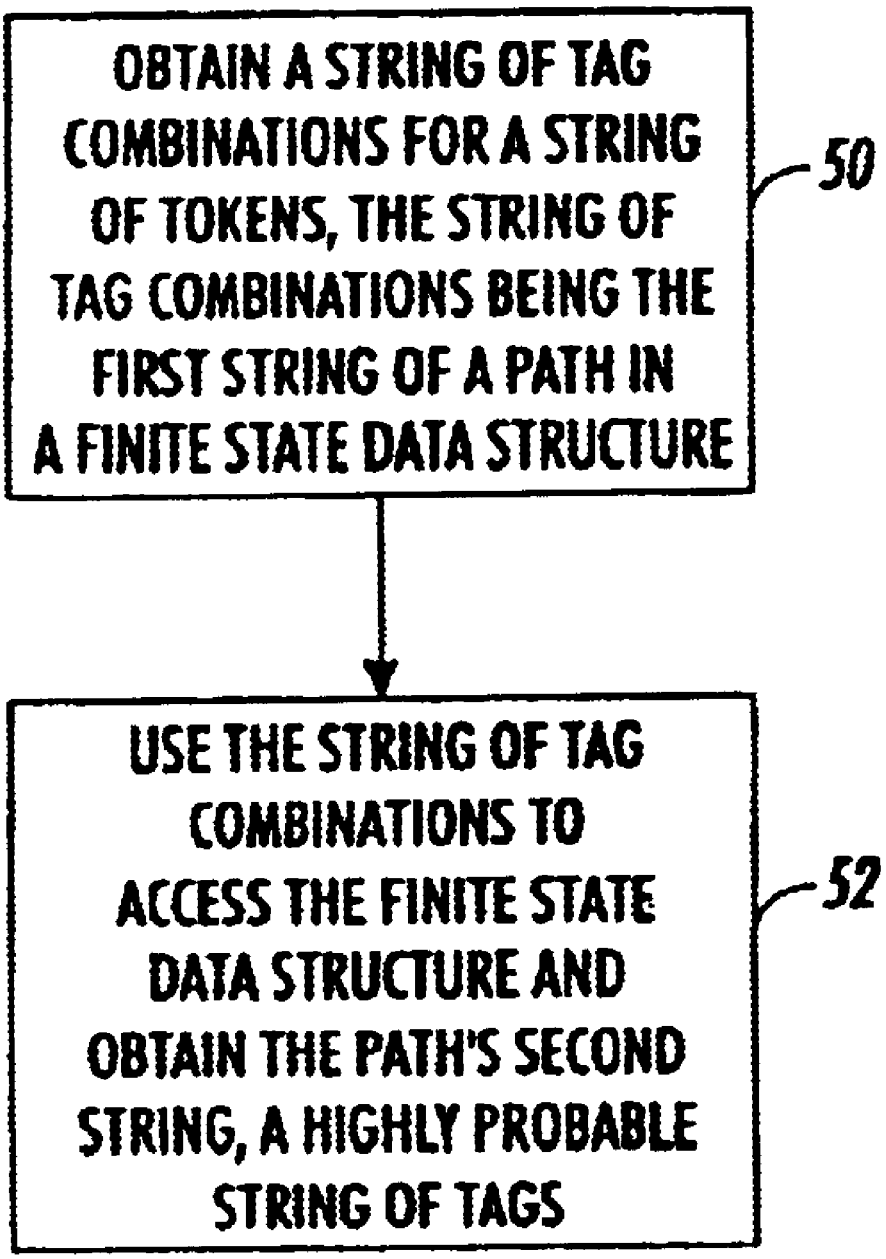
FIG. 2 is a flow chart showing general acts in using a finite state data structure as in FIG. 1 to tag text.
Figure 3:
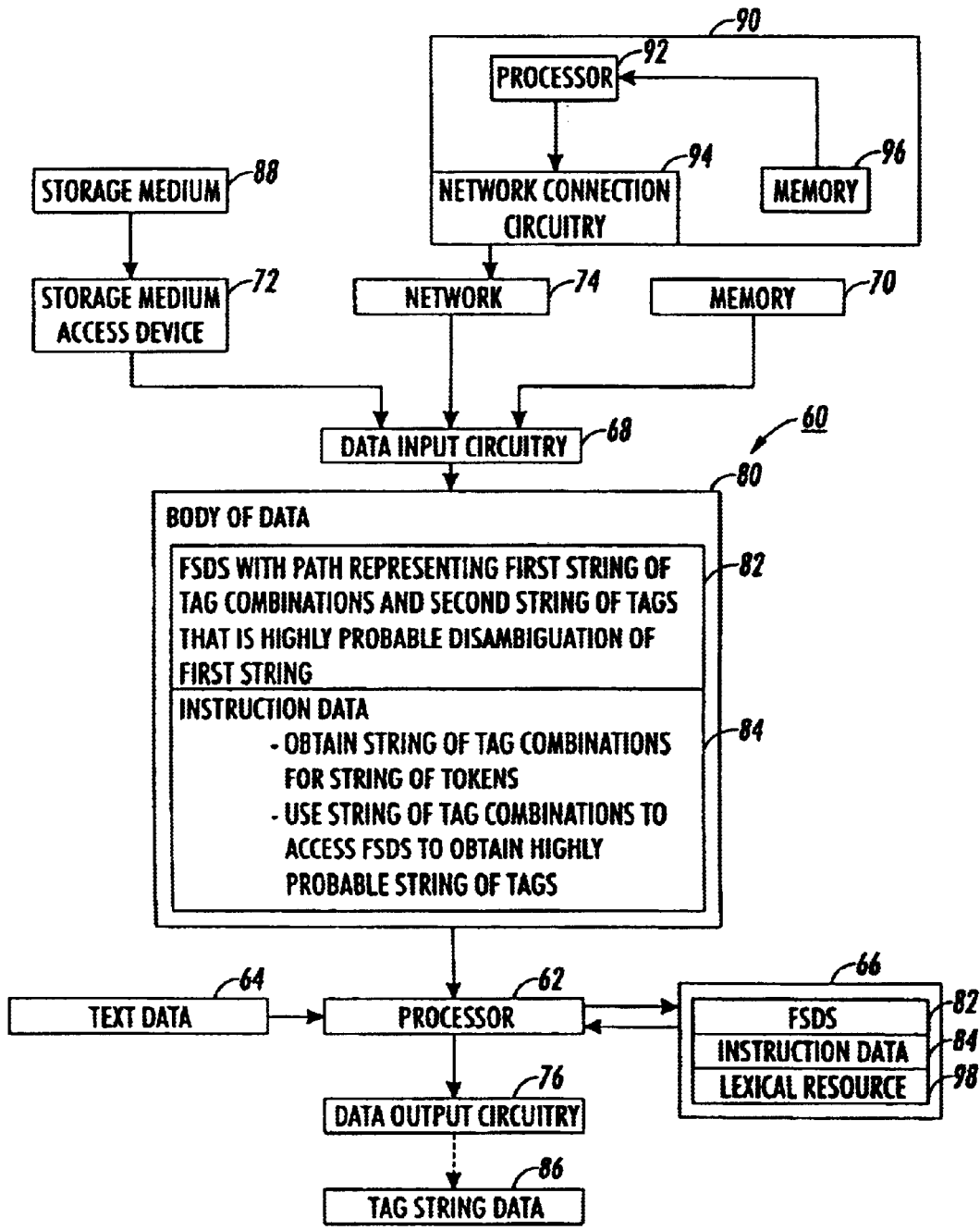
FIG. 3 is a schematic block diagram showing components of a system in which the acts in FIG. 2 can be implemented.

FIGS. 1–3 illustrate general features of the invention.

FIG. 1 is a schematic diagram that shows finite state data structure 10 in which a path that begins with state 12 and ends with state 14 represents a pair of strings, one a string of tag combinations and the other a string of tags for tokens in a language. The string of tags is a highly probable disambiguation of the string of tag combinations. The path also includes transition 20, one of the outgoing transitions of state 12; state 22, the destination of transition 20; transition 24, one of the incoming transitions of state 14; and state 26, the source of transition 24. As suggested by the ellipsis between states 22 and 26, the path can also include a number of other transitions and states.

In FIG. 1, the path represents string 30 which includes tag combinations {tab comb. 1, tag comb. 2, . . . tag comb. M} and which is shown above the path. The path also represents string 32 which includes tags {tag 1, tag 2, . . . tag N} and which is shown below the path. The path can be accessed with the string of tag combinations to obtain the string of tags. If there are no other paths that represent string 30, no further selection is necessary to obtain a highly probable disambiguation of string 30. Even if there are more than one paths representing string 30, the set of such paths can represent only highly probable strings of tags for string 30, so that only highly probable disambiguations are obtained.

In box 50 in FIG. 2, a technique obtains a string of tag combinations for a string of tokens, the string of tag combinations being the first string of a path in a finite state data structure. Then, in box 52, the technique uses the string of tag combinations to access the finite state data structure to obtain the path's second string, which is a highly probable string of tags for the string of tokens.

Machine 60 in FIG. 3 includes processor 62 connected for obtaining text data 64 defining a sample text and also connected for accessing data in memory 66. Processor 62 is also connected for receiving data through data input circuitry 68, which can illustratively provide data received from connections to memory 70, storage medium access device 72, or network 74. Processor 62 is also connected for providing data through data output circuitry 76, which could provide data through connections to components similar to those from which data input circuitry 68 can receive data. Processor 62 therefore could be the central processing unit (CPU) of a personal computer, workstation, or server, or any other processing device capable of operating as described below.

Text data 64 could be obtained from any appropriate source, including user input circuitry (not shown), memory 66, or data input circuitry 68. If processor 62 is a server, for example, text data 64 could be received from a client machine through network 74 and data input circuitry 68, and results could similarly be provided to the client machine through data output circuitry 76 and network 74.

Body of data 80 illustratively provided by data input circuitry 68 includes FSDS 82 and could also include instruction data 84. FSDS 82 includes a path that represents a pair of strings, a first string that is a string of tag combinations and a second string that is a string of tags for tokens in a language. The second string is a highly probable disambiguation of the first string. The path can be accessed using the first string to obtain the second string.

In executing the instructions indicated by instruction data 84, processor 62 can automatically obtain a string of tag combinations for a string of tokens in the text indicated by text data 64. The string of tag combinations is the first string of a path in FSDS 82. Then, processor 62 can use the string of tag combinations to automatically access FSDS 82 to obtain the path's second string, which is a highly probable string of tags for the string of tokens. As suggested by the dashed line in FIG. 3, processor 62 could optionally provide tag string data 86 indicating the string of tags as output through data output circuitry 76.

As noted above, FIG. 3 illustrates three possible sources from which data input circuitry 68 could provide data to processor 62—memory 70, storage medium access device 72, and network 74.

Memory 70 could be any conventional memory within machine 60, including random access memory (RAM) or read-only memory (ROM), or could be a peripheral or remote memory device of any kind.

Storage medium access device 72 could be a drive or other appropriate device or circuitry for accessing storage medium 88, which could, for example, be a magnetic medium such as a set of one or more tapes, diskettes, or floppy disks; an optical medium such as a set of one or more CD-ROMs; or any other appropriate medium for storing data. Storage medium 88 could be a part of machine 60, a part of a server or other peripheral or remote memory device, or a software product. In each of these cases, storage medium 88 is an article of manufacture that can be used in a machine.

Network 74 can provide a body of data from machine 90. Processor 92 in machine 90 can establish a connection with processor 62 over network 74 through network connection circuitry 94 and data input circuitry 68. Either processor could initiate the connection, and the connection could be established by any appropriate protocol. Then processor 92 can access a body of data stored in memory 96 and transfer the body of data to processor 62 over network 74. Processor 62 can store the body of data in memory 66 or elsewhere, and can then execute the instructions to perform automatic language identification.

FIG. 3 also illustrates that memory 66 can store lexical resource 98, which processor 62 can access to obtain a tag combination for a token. Lexical resource 98 can, for example, be a conventional lexicon indicating the tags a token can have in the language.

C. Implementation

The general features described above could be implemented in numerous ways on various machines. Implementations described below have been implemented on a Sun Sparc 20 workstation running a Unix operating system and executing code written in the C programming language.

C.1. FST Implementations

Three different methods have been implemented for producing FSTs for part-of-speech tagging from an HMM tagger. These methods and the FSTs they produce are referred to herein as n-type, s-type and b-type.

All three types of FSTs build on probability matrices or other probability data of an underlying HMM tagger. The accuracy of probability data collected in the HMM training process has an impact on the tagging accuracy of both the HMM itself and on FSTs produced from it. The training of the HMM tagger can be done on either a tagged or untagged corpus using conventional techniques.

C.1.a. n-Type Transducers

Figure 4:
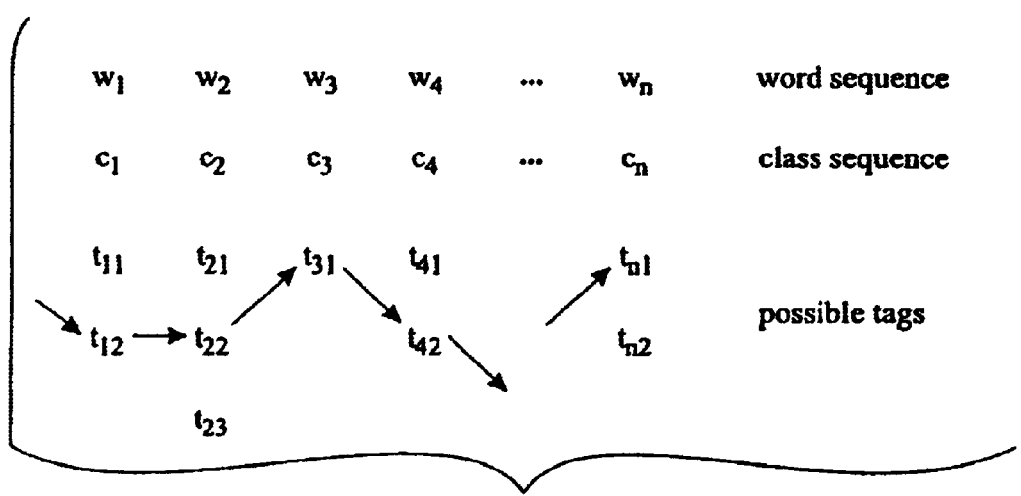
FIG. 4 is a schematic diagram illustrating decisions on tags with an n-type FST.

An n-type FST can approximate a first order HMM tagger. FIG. 4 illustrates decisions on tags with an n-type FST.

As in a first order HMM, the n-type method takes into account initial probabilities $\pi$, transition probabilities a, and class (i.e. observation symbol) probabilities b. However, probabilities over paths are not estimated. Unlike in an HMM, once a decision is made, it influences the following decisions but is itself irreversible.

FIG. 4 illustrates the tagging of a sequence of words by an n-type FST with an example: For the ambiguity class $c_1$ of word $w_1$, tag $t_{12}$ is selected which is the most likely tag in an initial position. For word $w_2$, the tag $t_{22}$, the most likely tag, is selected given class $c_2$ and the previously selected tag $t_{12}$, etc. The following equation can be used to select the tag $t_1$ of the first word $w_1$ from ambiguity class $c_1$, based on initial probability and class probability according to an HMM:

$$t_1 = \arg \max_k [\pi(t_{1,k}) b(c_1|t_{1,k})]$$

where $\pi$ is the initial probability of the tag and where b is the probability of the tag within the class. The following equation can be used to select the tag $t_i$ of the word $w_i$ from ambiguity class $c_i$ based on the transition and class probability of the tag according to the HMM:

$$t_i = \arg \max_k [a(t_{i,k}|t_{i-1}) b(c_i|t_{i,k})]$$

where a is the transition probability of the tag given the previous tag and where b is class probability as above.

Figure 5:
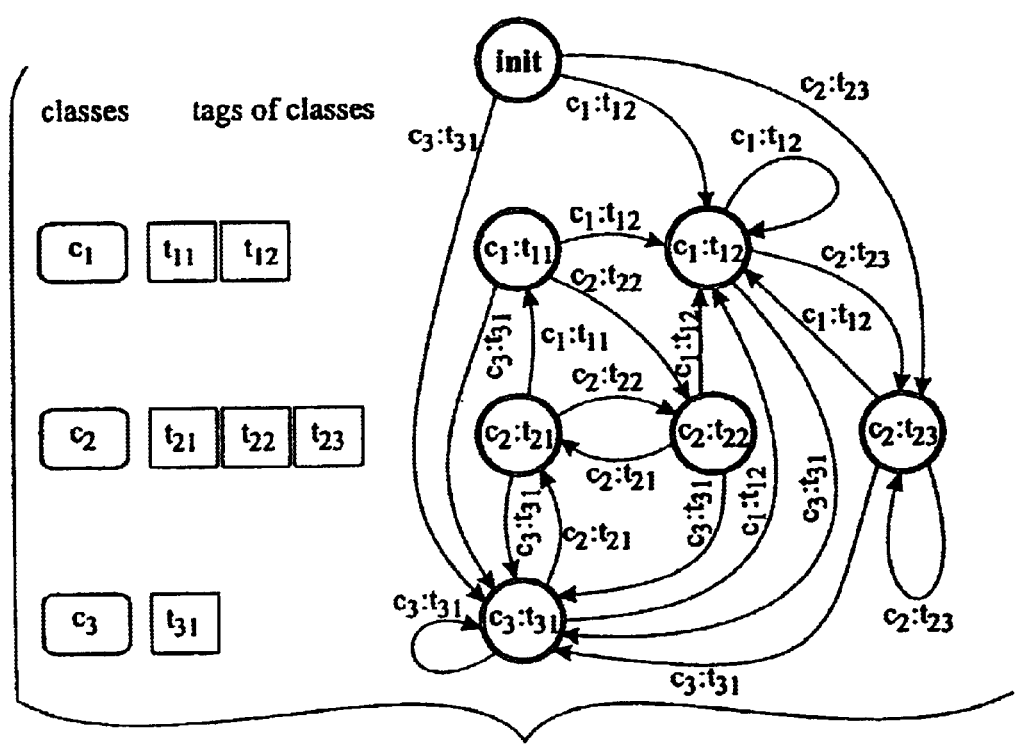
FIG. 5 is a schematic diagram illustrating production of an n-type FST.

An n-type FST that performs tagging as in FIG. 1 can be produced as illustrated in FIG. 5. In this example there is a set of three ambiguity classes—$c_1$ with the two tags $t_{11}$ and $t_{12}$, $c_2$ with the three tags $t_{21}$, $t_{22}$ and $t_{23}$, and $c_3$ with one tag $t_{31}$. Thus each ambiguity class is a tag combination that includes one or more tags. Different classes may contain the same tag, e.g. $t_{12}$ and $t_{23}$ may refer to the same tag (e.g. [NOUN]).

Figure 6:
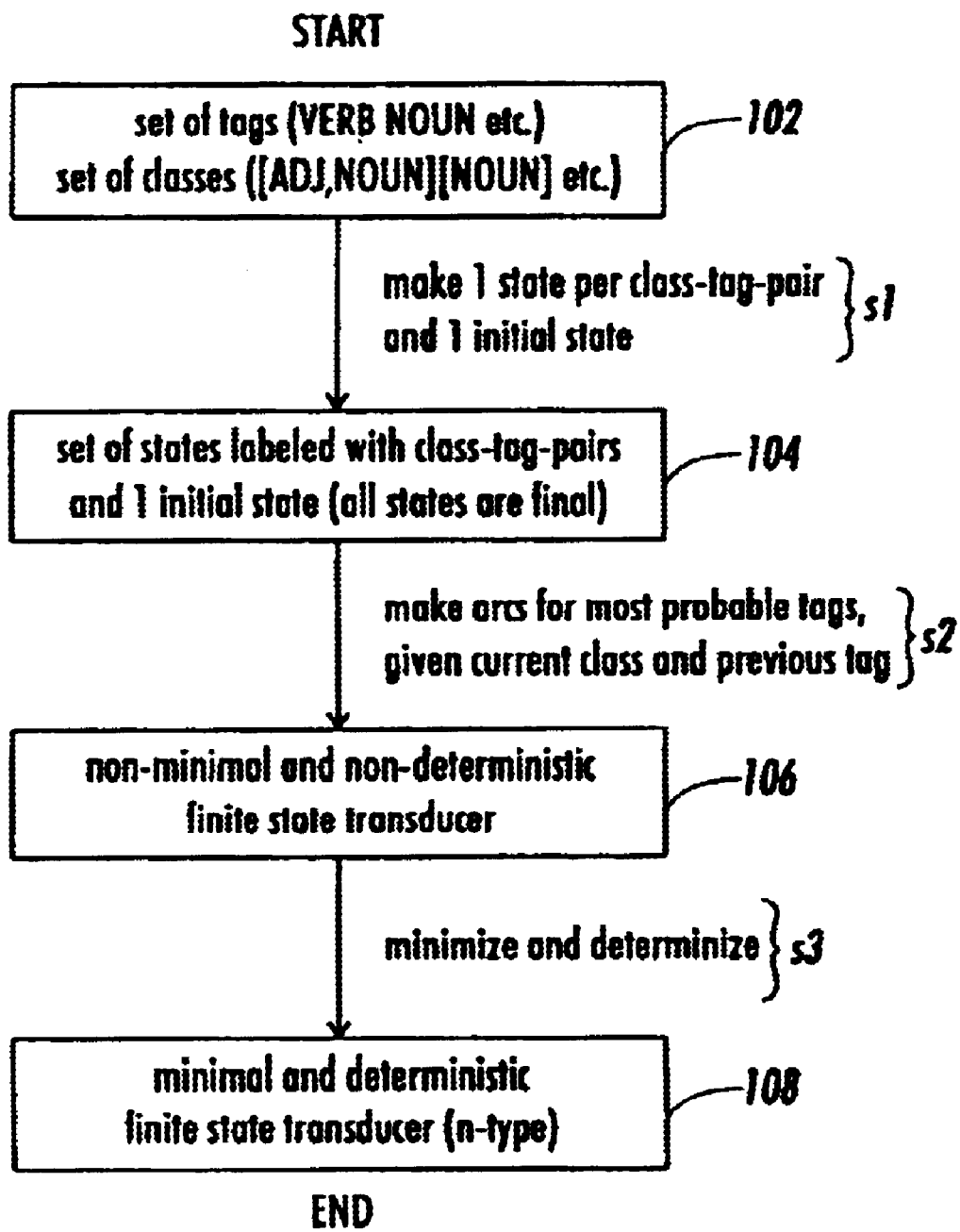
FIG. 6 is a flow diagram showing acts in producing an n-type FST.

FIG. 6 illustrates a procedure that produces an n-type FST. Sets 102 are a first set that includes the possible tags for words in the language and a second set that includes classes, each of which is a tag combination that includes one or more tags in the first set, an operation designated si creates, for every possible pair of a class and a tag in the class (e.g. $c_1:t_{12}$ or [ADJ,NOUN]:NOUN), a unique state labelled with this same pair. The resulting set of states could be used to map any class to any of its tags. Operation s1 also creates an initial state which does not correspond with any pair. All states are final, shown as double circles in FIG. 5. This produces a set of states 104 labelled with class-tag pairs and one initial state.

For every state in set 104, an operation designated s2 creates as many outgoing arcs as there are classes, illustratively three in FIG. 5. Each such arc for a particular class points to the state labelled with a most probable class-tag pair of this same class in accordance with a first order HMM. The following tag for an outgoing arc of a state can be determined based on the following class and on the current state's tag. If the arc comes from the initial state, a most probable pair of a class and a tag (destination state) can be determined by an estimate based on the initial and class probability of the tag according to the HMM:

$$\arg \max_k p_1(c_i, t_{ik}) = \pi(t_{ik}) \cdot b(c_i | t_{ik})$$

where π is the initial probability of a tag and where b is the probability of a tag within a class. If the arc comes from a state other than the initial state, a most probable pair can be determined by an estimate based on the transition and class probability of the tag according to the HMM:

$$\arg \max_k p_2(c_i, t_{ik}) = a(t_{ik} | t_{previous}) \cdot b(c_i | t_{ik})$$

where a is the transition probability of a tag given a previous tag and where b is class probability as above.

In the example in FIG. 5, $c_1:t_{12}$ is the most likely pair of class $c_1$ following the initial state, $c_2:t_{23}$ the most likely pair of class $c_2$ following the initial state, and $c_3:t_{31}$ the most likely pair of class $C_3$ following the initial state. These are not always the most likely pairs: $c_1:t_{11}$ is the most likely pair of class $c_1$ following the state labelled $c_1:t_{11}$; $c_2:t_{21}$ is the most likely pair of class $c_2$ following the states labelled $c_2:t_{22}$ and $c_3:t_{31}$; and $c_2:t_{22}$ is the most likely pair of class $c_2$ following the states labelled $c_1:t_{11}$ and $c_2:t_{21}$.

The operation designated s2 can label each arc with the same class:tag pair as its destination state, with the class symbol in the upper language and the tag symbol in the lower language. For example, every arc leading to the state labelled $c_1:t_{12}$ is also labelled with $c_1:t_{12}$. The result is the non-minimal and non-deterministic FST 106.

Finally, an operation can delete all state labels since the information from them is encoded in the arc labels and the network structure. The operation designated s3 can minimize and determinize the resulting version of FST 106 to produce n-type FST 108.

The mathematical model underlying the above method can be referred to as an n1-type model, resulting n-type FST 108 an n1-type FST, and the whole method leading from the HMM to n-type FST 108 an n1-type approximation of a first order HMM.

The n1-type approximation could easily be adapted to produce an n-type FST using a second order HMM, thus providing an n2-type approximation. In an n2-type approximation, every state would be labelled with the two previous output tags.

An n0-type approximation could also be implemented, by using only probabilities b. This implementation would have only one state, the unlabelled initial state, with one looping arc for every ambiguity class.

Every n-type FST is sequential, meaning that it is deterministic on the input side. In every state there is exactly one outgoing arc for every class symbol. An n-type FST tags any corpus deterministically.

An alternative n-type approximation that would produce the same FST as the above method is as follows:

Replace operation s1 in FIG. 6 with an operation that creates, for every possible tag (e.g. ADJ, NOUN, or VERB), a unique state labelled with the tag, and that also creates an unlabelled initial state which does not correspond to any tag. All states are final, allowing an input sequence to be finished at any point, and allowing the state label to designate a tag provided as output immediately before the state was reached.

Replace operation s2 in FIG. 6 with an operation that creates, from every state, as many outgoing arcs as there are classes, such as [ADJ], [NOUN], [VERB], [ADJ NOUN], [ADJ NOUN VERB], and [NOUN VERB], with each arc labelled with its class. For each arc, the most probable tag in the context of the current class (from the arc label) and the previous tag (from the source state label) can be determined using probabilities from an HMM as described above, and operation s2 can make the arc's destination the state with the arc's most probable tag. Then, operation s2 can relabel each arc with a class/tag pair that includes the class from its previous label and the tag from its destination state's label. Operation s2 can also delete the state labels, since they are no longer necessary.

Although the resulting FST is deterministic, it may not be minimal. Therefore, operation s3 in FIG. 6 can be replaced with a minimization operation.

The following variations of this alternative n-type approximation are also possible:

An FST can be partially prepruned to reduce the number of class/tag pairs. This is important with finite state operations that can handle only up to a maximum number of symbols and symbol pairs; for example, operations in the Xerox finite state library can handle a maximum of about 32,000 symbols and symbol pairs. Before creating class/tag pairs, all states with no incoming arcs can be deleted, except the initial state, and the outgoing arcs of the deleted states can also be deleted. Any remaining states that have no incoming arcs as a result of deletions can then be deleted, together with their outgoing arcs, and so forth iteratively until the number of arcs deleted in an iteration falls below a threshold.

If prepruning is not to be done, the alternative n-type approximation can be modified so that each arc is labelled with a pair immediately upon creation, rather than postponing labelling with pairs until all arcs have been created.

C.1.b. s-Type FSTs

Another method that approximates a first order HMM by an FST is referred to herein as an s-type approximation.

C.1.b.i. Background

To tag a sentence, i.e. to map a string of tag combinations such as its class sequence to a string of tags, a method can split the class sequence into subsequences at unambiguous classes that contain one tag only, then tag each subsequence separately, and then concatenate the tagged subsequences again. The result can be equivalent to that obtained by tagging the sentence as a whole.

Figure 7:
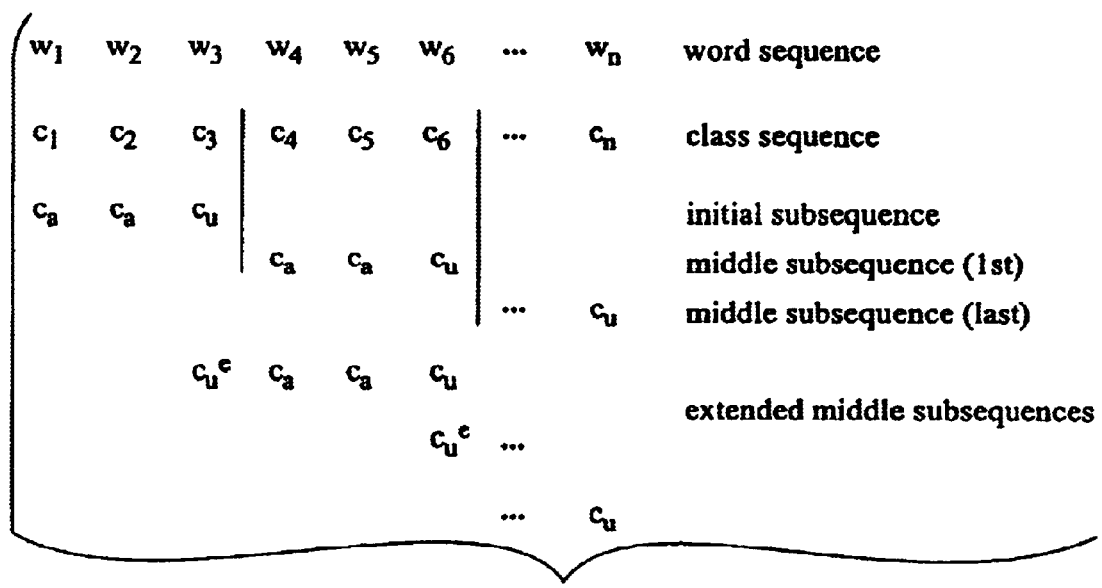
FIG. 7 is a schematic diagram illustrating class subsequences of a sentence.

FIG. 7 shows class subsequences of a sentence, each including zero or more ambiguous classes designated $c_a$, and ending with an unambiguous class designated $c_u$. Two types of class subsequences can be distinguished—initial and middle subsequences. The final subsequence of a sentence is equivalent to a middle one, if it is assumed that the sentence end symbol (. or ! or ?) is always an instance of an unambiguous class $c_u$.

An initial subsequence $C_i$ starts with the sentence initial position, has zero or more ambiguous classes $c_a$, and ends with the first unambiguous class $c_u$ of the sentence. It can be described by the regular expression:

$$C_i = c_a {}^* c_u$$

Given an initial class subsequence $C_i$ of length r, its joint probability taken together with an initial tag subsequence $T_i$ can be estimated based on probabilities according to an HMM:

$$p(C_i, T_i) = \pi(t_1) \cdot b(c_1|t_1) \cdot \left[ \prod_{j=2}^{r-1} a(t_j|t_{j-1}) \cdot b(c_j|t_j) \right] \cdot a(t_r|t_{r-1})$$

where $\pi$, a, and b are initial, transition, and class probabilities as described above.

A middle subsequence $C_m$ starts immediately after an unambiguous class $c_u$, has zero or more ambiguous classes $c_a$, and ends with the following unambiguous class $c_u$. It can be described by the regular expression:

$$C_m = c_a {}^* c_u$$

To estimate the probability of middle tag subsequences $T_m$ correctly, we have to include the immediately preceding unambiguous class $c_u^e$ actually belonging to the preceding subsequence $C_i$ or $C_m$. Thus we obtain an extended middle subsequence described by the regular expression:

$$C_m^e = c_u^e c_a {}^* c_u$$

The joint probability of an extended middle class subsequence $C_m^e$ of length s taken together with a tag subsequence $T_m^e$ can be estimated based on probabilities according to an HMM:

$$p(C_m^e, T_m^e) = \left[ \prod_{j=1}^{s-1} a(t_j|t_{j-1}) \cdot b(c_j|t_j) \right] \cdot a(t_s|t_{s-1})$$

where a and b are transition and class probabilities as described above.

C.1.b.ii. Producing s-type FSTs

To produce an s-type FST, a method can generate a large number of initial class subsequences $C_i$ and extended middle class subsequences $C_m^e$ as described below, and disambiguate or tag each subsequence based on a first order HMM such as by using the Viterbi algorithm. Then the method can link every class subsequence to its most probable tag subsequence by a conventional finite state cross product operation:

$$S_i = C_i . x . T_i = c_1 : t_1 \; c_2 : t_2 \ldots c_n : t_n$$

$$S_m^e = C_m^e . x . T_m^e = c_1^e : t_1^e \; c_2 : t_2 \ldots c_n : t_n$$

Then the method can obtain separately the union $^U S_i$ of all initial subsequences $S_i$ and the union $^U S_m^e$ of all extended middle subsequences $S_m^e$. The method can concatenate the two resulting FSTs, under appropriate constraints, to obtain an s-type FST.

For correct concatenation, it is necessary to recall that, in all extended middle subsequences $S_m^e$, such as $$S_m^e = \frac{C_m^e}{T_m^e} = \frac{[\text{DET}] \quad [\text{ADJ, NOUN}] \quad [\text{ADJ, NOUN}] \quad [\text{NOUN}]}{\text{DET} \qquad \text{ADJ} \qquad \qquad \text{ADJ} \qquad \qquad \text{NOUN}}$$

the first class symbol on the upper side and the first tag symbol on the lower side will be marked as an extension that does not really belong to the middle subsequence but is necessary to disambiguate it correctly. Using zeroes to indicate the presence of such an extension, the above example becomes $$S_m^0 = \frac{C_m^0}{T_m^0} = \frac{0.[\text{DET}] \quad [\text{ADJ, NOUN}] \quad [\text{ADJ, NOUN}] \quad [\text{NOUN}]}{0.\text{DET} \qquad \text{ADJ} \qquad \qquad \text{ADJ} \qquad \qquad \text{NOUN}}$$

Now it is possible to formulate a preliminary sentence model containing one initial subsequence followed by zero or more extended middle subsequences:

$$^U S^0 = {}^U S_i {}^U S_m^{0*}$$

where all middle subsequences $S_m^0$ are still marked and extended in the sense that each unambiguous class (other than a sentence end) occurs twice—once unmarked at the end of a subsequence and also marked at the beginning of the following subsequence.

To ensure correct concatenation of subsequences, the method can apply a concatenation constraint for classes. An example of such a constraint is $$R_c = \bigcap_j [\sim \$[\backslash c_u \; c_u^0]]_j$$

stating that every middle subsequence must begin with the same marked unambiguous class $c_u^0$ (e.g. 0.[DET] in the above example) that occurs unmarked as $c_u$ (e.g. [DET]) at the end of the preceding subsequence since both symbols refer to the same occurrence of this unambiguous class.

To ensure correct concatenation, the method can compose the preliminary sentence model $^U S^0$ with the concatenation constraint $R_c$, and the resulting model can in turn be composed with another concatenation constraint, and so forth. When the preliminary sentence model has been composed with all concatenation constraints, the method can delete all marked classes on the upper side and all marked tags on the lower side of the relation.

The above mathematical model is referred to as an s-type model, the corresponding FST an s-type FST, and the algorithm leading from the HMM to the FST an s-type approximation of an HMM.

An s-type FST tags any corpus that does not contain unknown subsequences exactly the same way, i.e. with the same errors, as the HMM tagger on which the FST is based. An s-type FST is, however, incomplete if it encodes only a limited set of subsequences of ambiguity classes; an incomplete s-type FST cannot tag sentences with one or more subsequences that are not in this limited set. An incomplete s-type FST can be completed as described below in relation to FIG. 8.

Figure 8:
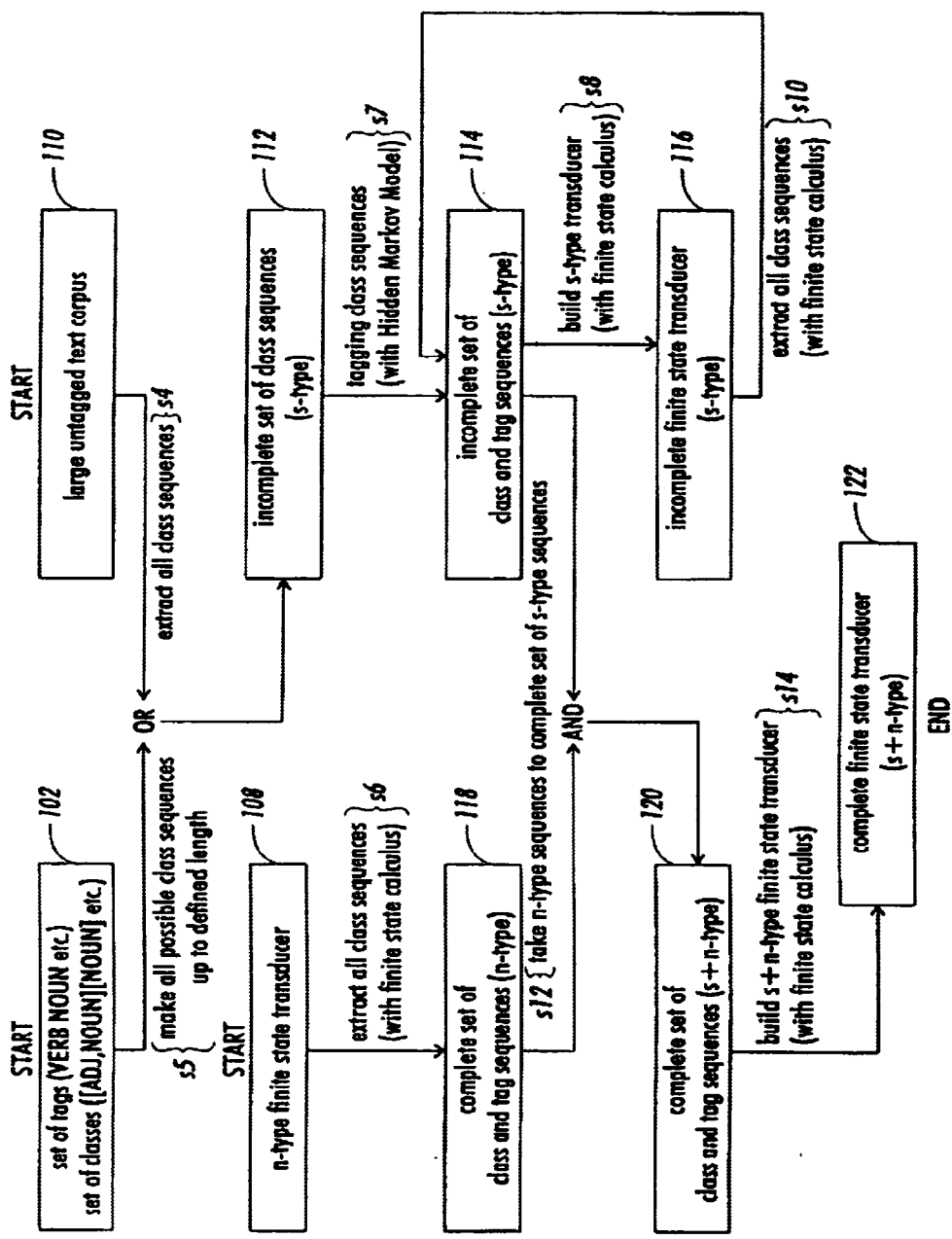
FIG. 8 is a flow diagram illustrating production of an s-type FST.

The above general description of methods for producing an s-type FST could be implemented in various ways, some of which are illustrated in FIG. 8.

FIG. 8 illustrates three ways to obtain subsequences that can be used to build an s-type FST. One way to obtain subsequences is to use a large untagged text corpus 110 for training. Based on a lexicon and a guesser for unknown words, the operation designated s4 annotates corpus 110 with class labels, exactly as would be done for the purpose of tagging. Operation s4 then extracts from every sentence the initial class subsequence $C_i$ that ends with the first unambiguous class $c_u$, and all extended middle subsequences $C_m^0$ extending from any unambiguous class $c_u$ in the sentence to the following unambiguous class. Operation s4 thus generates an incomplete set of class subsequences, referred to as s-type subsequences.

Another way to obtain subsequences is to use sets 102, which are a first set of tags and a second set of classes as described above in relation to FIG. 6. An operation designated s5 can split the second set, which includes all classes, into the subset of unambiguous classes $c_u$ and the subset of ambiguous classes $c_a$. Then operation s5 can generate all possible initial and extended middle class subsequences, $C_i$ and $C_m^e$, up to a defined length.

Like operation s4, operation s5 generates an incomplete set of s-type class sequences. If both operations are performed, the two incomplete sets can be ORed to obtain incomplete set 112, or incomplete set 112 could be obtained by performing either operation s4 or operation s5.

An operation designated s7 can use an HMM to tag class subsequences in incomplete set 112 to obtain an incomplete set 114 of s-type class and tag sequences. An operation designated s8 can perform conventional finite state calculus operations on set 114 to build an incomplete s-type FST 116.

FIG. 8 also illustrates how an operation designated s10 could perform conventional finite state calculus operations on FST 116 (or on any other FST according to the invention) to extract all class and tag sequences, thus obtaining, in the case of FST 116, incomplete set 114.

Therefore, another way to obtain subsequences is to use n-type FST 108, obtained as in FIG. 6 or in another way. An operation designated s6 can extract initial and extended middle class and tag subsequences, $S_i$ and $S_m^e$, using conventional finite state calculus operations, to produce a complete set 118 of n-type class and tag sequences. Complete set 118 can subsequently be used with incomplete set 114, as described below.

In general, s-type FSTs produced from incomplete set 114 or from other incomplete sets are not complete on the input side. They do not accept all possible ambiguity class sequences. An FST used to disambiguate class sequences of an arbitrary corpus should, however, accept all sequences, since a new corpus can contain sequences not encountered in the training corpus.

An operation designated s12 can complete incomplete set 114 with subsequences from complete set 118 as follows:

First, operation s12 can obtain the unions of initial and extended middle subsequences $^U_s S_i$ and $^U_s S_m^e$ from incomplete set 114 and the unions of initial and extended middle subsequences $^U_n S_i$ and $^U_n S_m^e$ from complete set 118.

Then, operation s12 can perform a priority union $^U S_i$ of initial subsequences:

$$S_i = {}^U_s S_i [[{}^U_n S_i . u - {}^U_s S_i . u] . o . {}^U_n S_i]$$

and a priority union $^U S_m^e$ of extended middle subsequences:

$$^U S_m^e = {}^U_s S_m^e [[{}^U_n S_m^e . u - {}^U_s S_m^e . u] . o . {}^U_n S_m^e]$$

In both cases, operation s12 unions all subsequences from incomplete set 114 with all those subsequences from complete set 118 that are not in incomplete set 114. The resulting set 120 is therefore a complete set of class and tag sequences of both s- and n-types.

Finally, an operation designated s14 uses complete set 120, performing conventional finite state operations to produce complete s+n-type FST 122. Operation s14 could, for example, produce two FSTs, one each from the unions of subsequences $^U S_i$ and $^U S_m^e$, and then use the two FSTs to produce FST 122 by following the above described procedure for producing s-type FSTs, except for the priority union operations described in relation to operation s12. FST 122 disambiguates all subsequences known to the principal incomplete s-type model exactly as the underlying HMM does, and all other subsequences as the auxiliary n-type model does.

C.1.c. b-Type FSTs

Another method that approximates a first order HMM by an FST is referred to herein as b-type approximation. Regular expression operators used in this and other sections can be understood from Kempe, A., "Finite State Transducers Approximating Hidden Markov Models", in *Proceedings of the 35th Annual Meeting of the Association for Computational Linguistics*, Madrid, Spain, 1997, pp. 460–467, and Kempe, A., "Look-Back and Look-Ahead in the Conversion of Hidden Markov Models into Finite State Transducers", in *Proceedings of the 3rd Conference on New Methods in Natural Language Processing (NeMLap)*, Sydney, Australia, 1998, pp. 29–37, both incorporated herein by reference.

C.1.c.i. Background

Tagging of a sentence based on a first order HMM includes finding the most probable tag string given the class string of the sentence.

In this approach, an ambiguity class is disambiguated with respect to a context. A context consists of a sequence of ambiguity classes limited at both ends by disambiguated tags. On the left side of a class is a look-back context of length $\beta$, and on the right side of a class is a look-ahead context of length $\alpha$.

Figure 9:
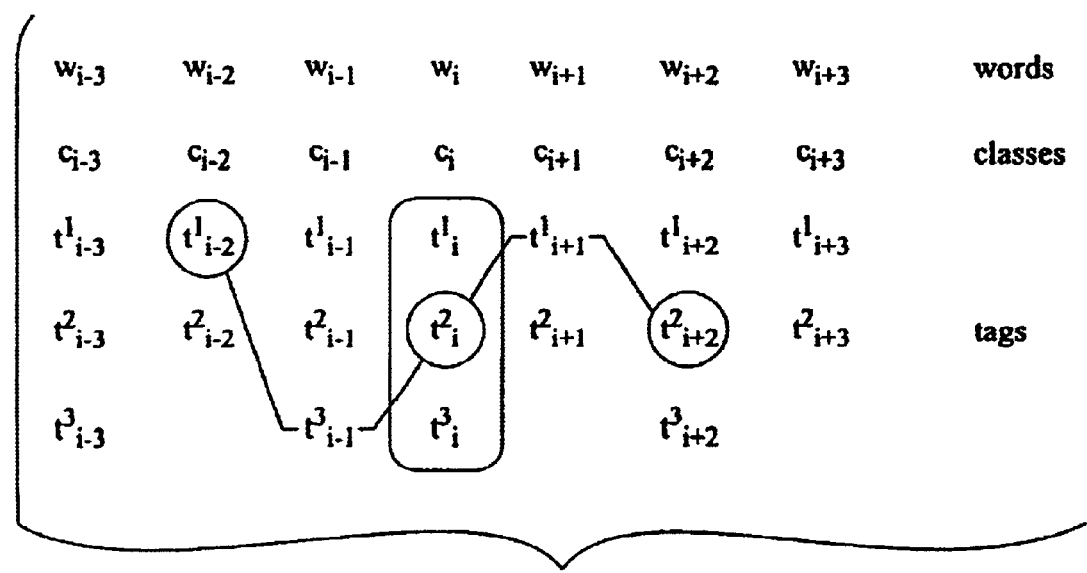
FIG. 9 is a schematic diagram illustrating the disambiguation of classes between two selected tags.
Figure 10:
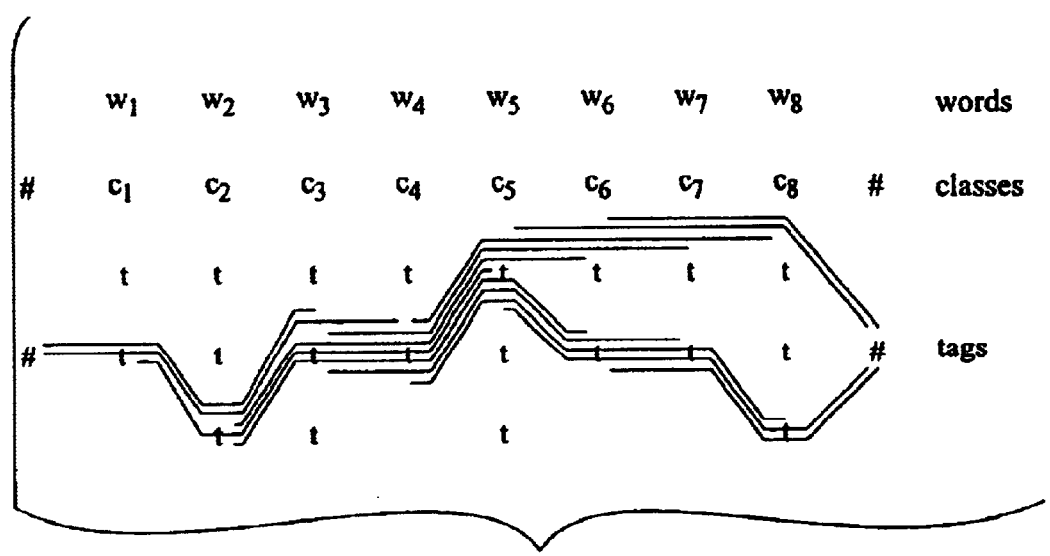
FIG. 10 is a schematic diagram illustrating valid paths through the tag space of a sentence.

In the example shown in FIG. 9, the tag $t^2_i$ can be selected as the most probable tag from the class $c_i$ because it is between two arbitrarily selected tags, $t^1_{i-2}$ at a look-back distance of $\beta=2$ and $t^2_{i+2}$ at a look-ahead distance of $\alpha=2$. Arbitrarily selecting tags $t^1_{i-2}$ and $t^2_{i+2}$ allows not only disambiguation of the class $c_i$ but of all classes between the two tags, i.e. $c_{i-1}$, $c_i$ and $c_{i+1}$. The tagging of a whole sentence can be approximated by tagging subsequences with arbitrarily selected tags at both ends as in FIG. 9, and by then overlapping the tagged subsequences. The most probable paths in the tag space of a sentence, i.e. valid paths according to this approach, can be found as sketched in FIG. 10. A valid path could be defined as an ordered set of overlapping sequences where every sequence is shifted by one tag to the right with respect to the previous sequence and where the last sequence in the set extends from the beginning to the end of the sentence. As shown in FIG. 10, there can be more than one valid path in the tag space of a sentence. Sets of sequences that do not overlap in some such way are incompatible according to this model, and are not valid paths.

C.1.c.ii. Producing b-Type FSTs

Figure 11:
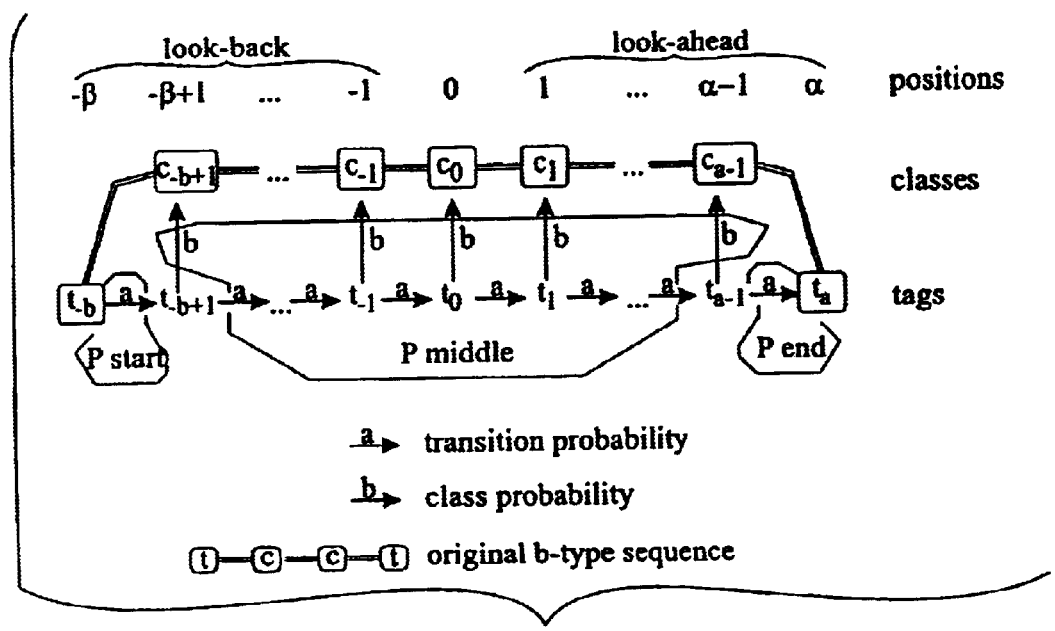
FIG. 11 is a schematic diagram illustrating b-type sequences.

Given a look-back length $\beta$ and a look-ahead length $\alpha$, FIG. 11 suggests how a method can generate, for every class $c_0$, every look-back sequence $t_{-\beta} c_{-\beta+1} \ldots c_{-1}$, and every look-ahead sequence $c_1 \ldots c_{\alpha-1} t_\alpha$, a b-type sequence:

$$t_{-\beta} c_{-\beta+1} \ldots c_{-1} c_0 c_i \ldots c_{\alpha-1} t_\alpha$$

For example:

CONJ[DET,PRON][ADJ,NOUN,VERB][NOUN,VERB]VERB is a b-type sequence in which $c_0$ is "[ADJ, NOUN, VERB]", the look-back sequence is "CONJ [DET, PRON]", and the look-ahead sequence is "[NOUN, VERB] VERB".

As further suggested in FIG. 11, each such b-type sequence can be disambiguated based on a first order HMM, such as by the Viterbi algorithm. The following explanation relates to disambiguation based on a first order HMM. In the case of a second order HMM, b-type sequences must begin and end with two arbitrarily selected tags rather than one.

For a b-type sequence, the joint probability of its class sequence C with its tag sequence T, shown below the class sequence in FIG. 11, can be estimated based on transition and class probabilities according to an HMM:

$$p(C, T) = p(c_{-\beta+1} \ldots c_{\alpha-1}, t_{-\beta} \ldots t_\alpha) = \left[ \prod_{i=-\beta+1}^{\alpha-1} a(t_i | t_{i-1}) b(c_i | t_i) \right] \cdot a(t_\alpha | t_{\alpha-1})$$

where a is the transition probability and b is the class probability as described above.

A boundary, i.e. a sentence beginning or end, may occur at any position in the look-back sequence or in the look-ahead sequence, and the look-back length and look-ahead length can each take any value of zero or more. As shown in FIG. 11, the above probability estimation can then be expressed more generally as:

$$p(C, T) = p_{start} \cdot p_{middle} \cdot p_{end}$$

with $p_{start}$ being $p_{start} = a(t_{-\beta+m} | t_{-\beta})$ for fixed tag $t_{-\beta}$ $p_{start} = \pi(t_{-\beta+m})$ for sentence beginning # where $\pi$ is the initial probability as described above and where m can have any value less than $\beta$ at which a sentence beginning occurs.

$p_{start} = 1$ for $\beta=0$, i.e. no look-back
with $p_{middle}$ being $p_{middle} = b(c_{-\beta+1} | t_{-\beta+1}) \cdot \prod_{i=-\beta+2}^{\alpha-1} a(t_i | t_{i-1}) b(c_i | t_i)$ for $\beta + \alpha > 0$ $p_{middle} = b(c_0 | t_0)$ for $\beta + \alpha = 0$ $p_{middle} = b(c_0 | t_0)$ for $\beta+\alpha=0$
and with $p_{end}$ being $p_{end} = a(t_\alpha | t_{\alpha-1})$ for fixed tag $t_\alpha$ $p_{end} = 1$ for sentence end # or $\alpha = 0$, i.e. no look-ahead.

When the most probable tag sequence is found for a b-type sequence, a method can associate the class $c_0$ in the middle position with its most likely tag $t_0$. The method can also apply constraints formulated for the other tags $t_{-\beta}$ and $t_\alpha$ and classes $c_{-\beta+1} \ldots c_{-1}$ and $c_1 \ldots c_{\alpha-1}$ of the b-type sequence. Thus we obtain a tagged b-type sequence:

$t_{-\beta} \, c_{-\beta+1} \ldots c_{-1} \, c_0 {:} t_0 \, c_1 \ldots c_{\alpha-1} \, t_\alpha$ stating that $t_0$ is the most probable tag in the class $c_0$ if i is preceded by $t_{-\beta} \, c_{-\beta+1} \ldots c_{-1}$ and followed by $c_1 \ldots c_{\alpha-1} \, t_\alpha$.
In the example:

CONJ-B2[DET,PRON]-B1[ADJ,NOUN,VERB]:ADJ[NOUN, VERB]-A1 VERB-A2

ADJ is the most likely tag in the class [ADJ,NOUN,VERB] if it is preceded by the tag CONJ two positions back (B2) and by the class [DET,PRON] one position back (B1), and followed by the class [NOUN,VERB] one position ahead (A1) and by the tag VERB two positions ahead (A2).

A method can denote boundaries by a particular symbol, e.g. #, and such boundaries can occur anywhere in the look-back and look-ahead sequences. For example, in the first of the following tagged b-type sequences, the boundary occurs at position B2, while in the second the boundary occurs at position A1:

-B2[DET,PRON]-B1[ADJ,NOUN,VERB]:ADJ[NOUN,VERB]-A1 VERB-A2

CONJ-B2[DET,PRON]-B1[ADJ,NOUN,VERB]:NOUN #-A1

Therefore, look-back length $\beta$ and look-ahead length $\alpha$ also include all sequences shorter than $\beta$ or $\alpha$, respectively, that are limited by a boundary #.

Figure 12:
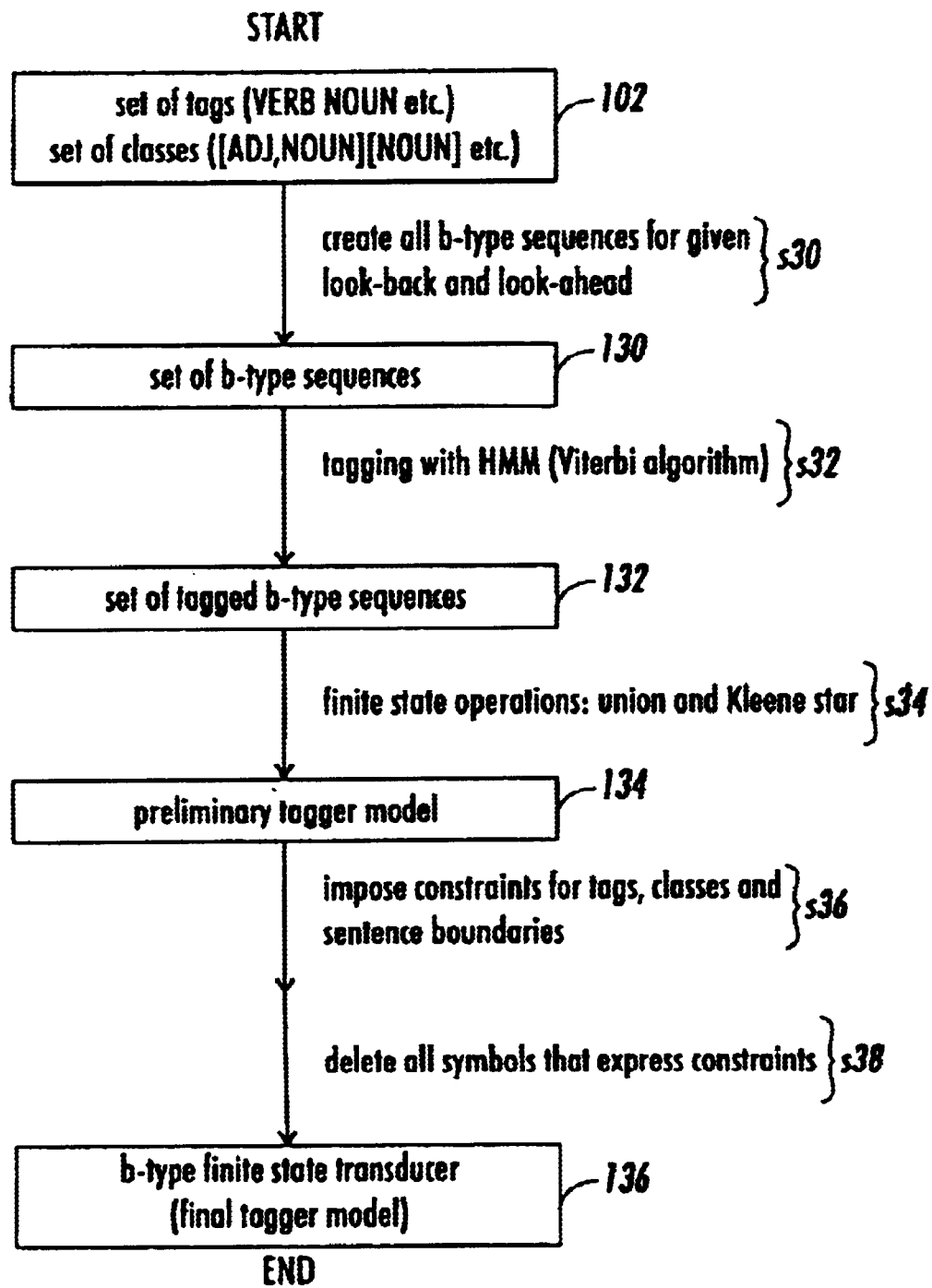
FIG. 12 is a flow diagram illustrating production of a b-type FST.

FIG. 12 shows a method of producing a b-type FST.

The method begins with sets 102, which are a first set of tags and a second set of classes as described above in relation to FIG. 6. For a given length $\beta$ of look-back and a length $\alpha$ of look-ahead, and using sets 102, an operation designated s30 generates set 130, which includes every possible b-type sequence. Then, an operation designated s32 tags each sequence in set 130 to obtain set 132 which includes tagged b-type sequences $B_i$. Operation s32 can disambiguate each sequence in set 130 statistically as described above. An operation designated s34 performs conventional finite state operations on sequences $B_i$ in set 132 to obtain a preliminary tagger model B' 134. For example, operation s34 can obtain B' as follows:

$$B' = \left[ \bigcup_i B_i \right] *$$

in which case all sequences $B_i$ can be accepted by model 134 in any order and zero or more times because no constraints have yet been applied.

To ensure a correct concatenation of sequences, the method in FIG. 12 makes sure that every sequence $B_i$ is preceded and followed by other $B_i$ according to look-back and look-ahead sequences as explained above.

Constraints can be created for preceding and following tags, classes and sentence boundaries. For look-back sequences, a particular tag $t_i$ or class $c_j$ is requested for a particular distance of $\delta \leq -1$, by:

$R^\delta(t_i) = \sim [\sim [?*t_i[\backslash^\cup t]*[^\cup t[\backslash^\cup t]*]^-(-\delta-1)t_i^{B(-\delta)}?*]$ $R^\delta(c_j) = \sim [\sim [?*c_j[\backslash^\cup c]*[^\cup c[\backslash^\cup c]*]^-(-\delta-1)c_j^{B(-\delta)}?*]$ for $\delta \leq -1$
with $^\cup t$ and $^\cup c$ being the union of all tags and all classes respectively. A sentence beginning, #, is requested for a particular look-back distance of $\delta \leq -1$, by:

$R^\delta(\#) = \sim [\sim [[\backslash^\cup t]*[^\cup t[\backslash^\cup t]*]^-(-\delta-1)\#^{B(-\delta)}?*]$ for $\delta \leq -1$
In the case of look-ahead sequences, for a particular distance of $\delta \geq 1$, a particular tag $t_i$ or class $c_j$ or a sentence end # is requested in a similar way, by:

$R^\delta(t_i) = \sim [?*t_i^{A\delta} \sim [[\backslash^\cup t]*[^\cup t[\backslash^\cup t]*]^-(\delta-1)t_i?*]]$ $R^\delta(c_j) = \sim [?*c_j^{A\delta} \sim [[\backslash^\cup c]*[^\cup c[\backslash^\cup c]*]^-(\delta-1)c_j?*]]$ $$R^\delta(\#) = \sim [?^* \#^{A\delta} \sim [[\backslash^\cup t]^* [^\cup t \backslash^\cup t]^*]'(\delta-1)]]$$

for $\delta \geq 1$

A method can create the intersection $R_t$ of all tag constraints $R^\delta(t_i)$, the intersection $R_c$ of all class constraints $R^\delta(c_j)$, and the intersection $R_\#$ of all sentence boundary constraints $R^\delta(\#)$:

$$R_t = \bigcap_{\delta,i} R^\delta(t_i)$$

$$R_c = \bigcap_{\delta,j} R^\delta(c_j)$$

$$R_\# = \bigcap_{\delta} R^\delta(\#)$$

An operation designated s36 can enforce all constraints for tags, classes and sentence boundaries by composition with the preliminary tagger model B' 134. The class constraint $R_c$ must be composed on the side of B' which is the side of the classes, treated here as the upper side, and both the tag constraint $R_t$ and the boundary constraint $R_\#$ must be composed on the side of B' which is the side of the tags, treated here as the lower side, to obtain a version of model 134 designated B":

$$B'' = R_c.o.B'.o.R_t.o.R_\#$$

An operation designated s38 can then delete all symbols that served to constrain tags, classes or boundaries from B" and can also determinize and minimize to obtain the final tagger model, b-type FST 136.

The above model is referred to as a b-type model, the resulting FST as a b-type FST, and the method leading from an HMM to a b-type FST, as a b-Type approximation of an HMM.

C.1.c.iii. Properties of b-Type FSTs

There are two groups of b-type FSTs with different properties—FSTs without look-back or without look-ahead and FSTs with both look-back and look-ahead. FSTs in both groups can accept any sequence of ambiguity classes.

FSTs in the first group, b-type FSTs without look-back or without look-ahead, are always sequential. Such FSTs always map a class string obtained from the word string of a sentence to exactly one tag string. Tagging accuracy and similarity with the underlying HMM increases with growing look-back or look-ahead. A b-type FST with look-back $\beta=1$ and without look-ahead ($\alpha=0$) is equivalent to an n1-type FST as defined above.

FSTs in the second group, b-type transducers with both look-back and look-ahead, are in general not sequential. For a class string obtained from the word string of a sentence, such FSTs provide a set of alternative tag strings, which means that the tagging results are ambiguous. This set is never empty, and the most probable tag string according to the underlying HMM is always in this set. The longer the look-back distance $\beta$ and the look-ahead distance $\alpha$, the larger the FST and the smaller the set of alternative tagging results. For sufficiently large look-back plus look-ahead, this set may always contain only one tagging result. In this case the b-type FST is equivalent to the underlying HMM. For size reasons, this FST is only computable for HMMs with small tag sets.

C.1.d. A Tagger with FSTs

A part-of-speech (POS) tagger has been implemented that can use FSTs produced as described above, and is referred to herein as an "FST tagger". In addition to a conventional tokenizer, the implemented FST tagger includes three FSTs—a conventional lexicon FST, a conventional guesser FST for unknown words, and a POS tagging FST. The POS tagging FST can be an approximation of an HMM, such as an n-type FST, an s-type FST" or a b-type FST produced according to one of the above methods.

C.1.d.i. FST Tagging

FIG. 13 illustrates tagging of a sentence by the implemented FST tagger. The string of tokens forming the sentence appears in the left column of FIG. 13, the ambiguity class for each token in the string appears next to the token in the center column, and the disambiguated tag for each token appears next to its ambiguity class in the right column.

Figure 14:
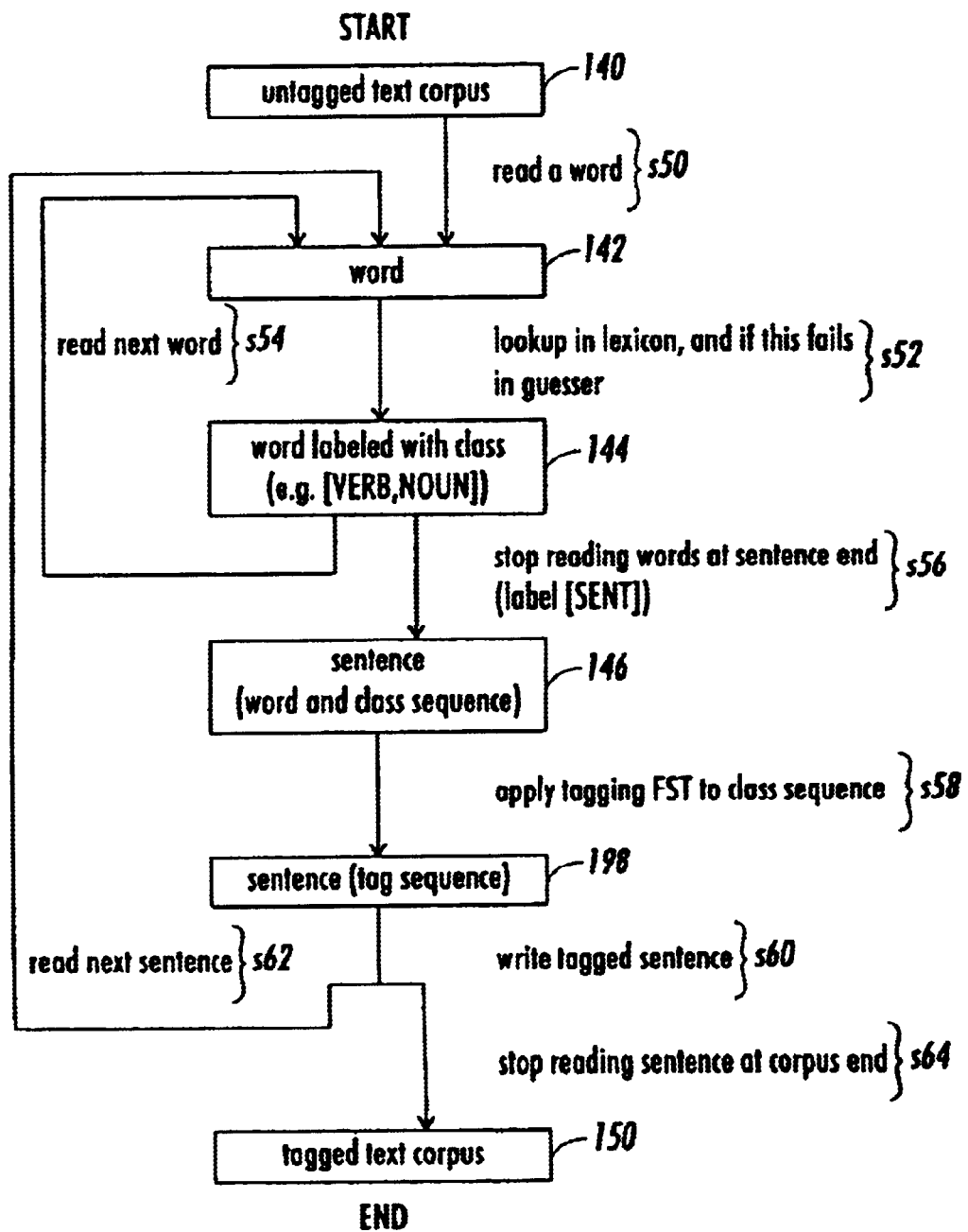
FIG. 14 is a flow diagram illustrating how a text corpus can be tagged with an FST tagger.

FIG. 14 illustrates a method performed by the implemented FST tagger in tagging untagged text corpus 140.

An operation designated s50 performs tokenization, reading the first word or token of corpus 140 to obtain word 142, thus beginning inner and outer iterative loops in which every word of each sentence in corpus 140 is read and handled. An operation designated s52 in the inner iterative loop obtains labelled word 144 by first applying the lexicon FST to obtain an ambiguity class for word 142 and, if the lexicon FST fails to provide an ambiguity class, by then applying the guesser FST for unknown words to obtain an ambiguity class. Operation s52 associates the ambiguity class obtained from the lexicon FST or from the unknown word guesser FST with word 142, resulting in a labelled word 144.

If the end of a sentence has not been reached, the inner iterative loop continues with an operation designated s54, which obtains the next word 142 by performing tokenization, reading the next word or token of a sentence. But when operation s52 labels a token with the sentence end class, e.g. [SENT], an operation designated s56 stops the inner iterative loop, and provides word and class sequence 146 for the sentence. No further words are read from corpus 140 until the sentence's class string, as shown in the center column of FIG. 13, has been tagged.

An operation designated s58 then applies the POS tagging FST to the class string from sequence 146 to deterministically map to the sentence's tag sequence 148, a string of tags as shown in the right column of FIG. 13. An operation designated s60 then uses tag sequence 148 to write the tagged sentence to an output stream, thus completing the outer iterative loop for the sentence.

If the end of corpus 140 has not been reached, an operation designated s62 prepares for the next iteration of the outer loop by beginning to read the next sentence of the corpus 140, obtaining word 142. When the end of corpus 140 is reached, an operation designated s64 stops reading and provides as the end result tagged text corpus 150.

C.1.d.ii. Tests and Results of FST Tagger

Table 1 compares an n-type and an s-type FST with the underlying HMM on an English test case. As expected, the FSTs perform tagging faster than the HMM.

TABLE 1

Accuracy, speed, and size of FSTs

| | Tagging accuracy in % | tagging speed on different computers in words/sec on ULTRA2 | On SPARC20 | transducer size num. states | num. Arcs |
|---|---|---|---|---|---|
| HMM | 96.77 | 4 590 | 1 564 | none | None |
| s-type transducer | 95.05 | 12 038 | 5 453 | 4 709 | 976 785 |
| n-type transducer | 94.19 | 17 244 | 8 180 | 71 | 21 087 |

| Language: | English |
|---|---|
| HMM training corpus: | 19 944 words |
| Test corpus: | 19 934 words |
| Tag set: | 74 tags 297 classes |
| s-Type transducer | with subsequences from a training corpus of 100,000 words completed with subsequences from an n-type transducer |

Since both FSTs are approximations of an HMM, they show a slightly lower tagging accuracy than the HMM.

However, improvement in accuracy can be expected since these FSTs can be composed with FSTs encoding correction rules for frequent errors, as described below.

The s-type FST is more accurate in tagging but also larger and slower than the n-type FST. Table 2 compares the tagging accuracy of n-type and s-type FSTs and the underlying HMM for different languages, further supporting the conclusion that the s-type FST is more accurate than the n-type FST, though not as accurate as the underlying HMM.

TABLE 2

Accuracy of FSTs and HMM for different languages

Tagging accuracy in %

| | English | Dutch | French | German | Portug. | Spanish |
|---|---|---|---|---|---|---|
| HMM | 96.77 | 94.76 | 98.65 | 97.62 | 97.12 | 97.60 |
| s-type transducer | 95.05 | 92.36 | 98.37 | 95.81 | 96.56 | 96.87 |
| n-type transducer | 94.19 | 91.58 | 98.18 | 94.49 | 96.19 | 96.46 | s-Type transducer  With subsequences from a training corpus of 100,000 words completed with subsequences from n-type transducer The test of b-type FSTs used an English corpus, lexicon and guesser for unknown words, that originally were annotated with 74 different tags. The test automatically recoded the tags in order to reduce their number, i.e. in some cases more than one of the original tags were recoded into one and the same new tag. The test applied different recodings, thus obtaining English corpora, lexicons and unknown word guessers with reduced tag sets of 45, 36, 27, 18 and 9 tags respectively.

TABLE 3

Accuracy, tagging speed, size, and creation time for b-type FSTs

| Transducer Or HMM | Accuracy test corp. in % | Tagging speed in words/second on Ultra2 | onSparc20 | Transducer size Num. of States | num. of arcs | Creation time on Ultra2 |
|---|---|---|---|---|---|---|
| HMM | 97.07 | 3 358 | 1 363 | — | — | — |
| b-FST ($\beta = 0, \alpha = 0$) | 94.47 | 25 521 | 11 815 | 1 | 119 | 3 sec |
| b-FST ($\beta = 1, \alpha = 0$) | 95.60 | 25 521 | 12 038 | 28 | 3 332 | 4 sec |
| b-FST ($\beta = 2, \alpha = 0$) | 97.71 | 25 521 | 11 193 | 1 642 | 195 398 | 32 min |
| b-FST ($\beta = 0, \alpha = 1$) | 95.26 | 17 244 | 9 969 | 137 | 14 074 | 5 sec |
| b-FST ($\beta = 0, \alpha = 2$) | 95.37 | 19 939 | 9 969 | 3 685 | 280 545 | 3 min |
| b-FST ($\beta = 1, \alpha = 1$) | *96.78 | 16 790 | 8 986 | 1 748 | 192 275 | 19 sec |
| b-FST ($\beta = 2, \alpha = 1$) | *97.06 | 22 787 | 11 000 | 19 878 | 1 911 277 | 61 min |

| Language | English |
|---|---|
| Corpora | 19 944 words for HMM training, 19 934 words for test |
| Tag set | 27 tags, 119 classes |
| * | Multiple, i.e. ambiguous tagging results: Only first result retained |
| Types of FST (Finite State Transducers) | |
| B ($\beta = 2, \alpha = 1$) | b-type transducer with look-back of 2 and look-ahead of 1 |
| Computers | |
| Ultra2 | 1 CPU, 512 MBytes physical RAM, 1.4 Gbytes virtual RAM |
| Sparc20 | 1 CPU, 192 MBytes physical RAM, 827 Mbytes virtual RAM |

Table 3 compares b-type FSTs with different look-back and look-ahead lengths for a tag set of 27 tags. The highest accuracy (97.06%) could be obtained with a b-type FST with $\beta=2$ and $\alpha=1$. This b-type FST produced ambiguous tagging results in some cases. In those cases, only the first result found was retained.

TABLE 4

Tagging accuracy of b-type FSTs with tags sets of different sizes

Tagging accuracy with tag sets of different sizes (in %)

| Transducer Or HMM | 74 tags 297 cls. | 45 tags 214 cls. | 36 tags 181 cls. | 27 tags 119 cls. | 18 tags 97 cls. | 9 tags 67 cls. |
|---|---|---|---|---|---|---|
| HMM | 96.78 | 96.92 | 97.35 | 97.07 | 96.73 | 95.76 |
| b-FST ($\beta = 0, \alpha = 0$) | 83.53 | 83.71 | 87.21 | 94.47 | 94.24 | 93.86 |

TABLE 4-continued

Tagging accuracy of b-type FSTs with tags sets of different sizes

| | | | | | | |
|---|---|---|---|---|---|---|
| b-FST (β = 1, α = 0) | 94.19 | 94.09 | 95.16 | 95.60 | 95.17 | 94.14 |
| b-FST (β = 2, α = 0) | — | 94.28 | 95.32 | 95.71 | 95.31 | 94.22 |
| b-FST (β = 0, α = 1) | 92.79 | 92.47 | 93.69 | 95.26 | 95.19 | 94.64 |
| b-FST (β = 0, α = 2) | 93.46 | 92.77 | 93.92 | 95.37 | 95.30 | 94.80 |
| b-FST (β = 1, α = 1) | *94.94 | *95.14 | *95.78 | *96.78 | *96.59 | *95.36 |
| b-FST (β = 2, α = 1) | — | — | *97.34 | *97.06 | *96.73 | *95.73 |
| b-FST (β = 3, α = 1) | — | — | — | — | — | 95.76 |

Language English
Corpora 19 944 words for HMM training, 19 934 words for test
Types of FST (Finite State Transducers) see Table 3
\* Multiple, i.e. ambiguous tagging results: Only first result retained
— Transducer could not be computed for reasons of size.

Table 4 shows the tagging accuracy of different b-type FSTs with tag sets of different sizes. To get results that are almost equivalent to those of an underlying HMM, a b-type FST apparently needs at least a look-back of β=2 and a look-ahead of α=1 or vice versa. For reasons of size, this kind of FST could only be computed for the tag sets with 36 tags or less. A b-type FST with β=3 and α=1 could only be computed for the tag set with 9 tags. This FST gave exactly the same tagging results as the underlying HMM.

C.1.e. Composing Tagging FSTs

As mentioned above, it is possible to compose a tagging FST with other conventional FSTs. It may be beneficial, for example, to compose a tagging FST with one or more conventional FSTs that encode:

- correction rules for the most frequent tagging errors in order to significantly improve tagging accuracy. These rules can either be extracted automatically from a corpus or written manually. The rules may include long-distance dependencies that are usually not handled by HMM taggers.
- further steps of text analysis, e.g. light parsing or extraction of noun phrases or other phrases.
- criteria which decide on the relevance of a corpus with respect to a particular query in information retrieval (e.g. occurrence of particular words in particular syntactic structures).

In general, a tagging FST can be composed with other transducers separately or all at once. Such composition enables complex text analysis to be performed by a single transducer, as disclosed in U.S. Pat. No. 5,625,554.

C.2. Bimachine Implementations

Methods have also been implemented to produce and use finite state bimachines for part-of-speech tagging. A bimachine is a finite state data structure equivalent to the composition of two sequential FSTs. More generally, a bimachine has an input alphabet, an output alphabet, two deterministic automata, and an emission function, as explained in Schutzenberger, M. P., "A remark on finite transducers", *Information and Control*, Vol. 4, 1961, pp. 185–187 and Roche, E., and Schabes, Y., "Introduction", in Roche, E., and Schabes, Y., Eds., *Finite-State Language Processing*, Cambridge, Mass., MIT Press, 1997, pp. 56–63.

C.2.a. Background

A bimachine can be constructed that includes two sequential FSTs $T_1$ and $T_2$ as follows: When the bimachine is applied to a string of input symbols, the first FST $T_1$ maps the input, from left to right, to a string of intermediate symbols which may have no particular meaning with respect to input and output strings. The second FST $T_2$ then maps the intermediate string, from right to left, to an output string.

In applying bimachines to tagging, the input string is a string of ambiguity classes and the output is a string of tags, as in the FST implementations described above. The intermediate string can, for example, be a string of reduced ambiguity classes from which the first FST $T_1$ has eliminated the most improbable tags. The second FST $T_2$ can then fully disambiguate the reduced ambiguity classes to obtain a highly probable string of tags for the input string of ambiguity classes.

FIG. 15 illustrates the four types of strings that occur in tagging a sentence with a bimachine implementation of this type. The string of tokens forming the sentence, as obtained with a conventional tokenizer, appears in the left column of FIG. 15, and the ambiguity class for each token in the string appears next to the token in the second column from the left, forming an input string of ambiguity classes for the bimachine. The reduced ambiguity class for each token appears next to its ambiguity class in the third column from the left, and the downward arrow between columns indicates that the intermediate string of reduced ambiguity classes is obtained by mapping from left to right. The disambiguated tag for each token appears next to its reduced ambiguity class in the right column, and the upward arrow between columns indicates that the output string of tags is obtained by mapping from right to left.

In FIG. 15, each ambiguity class and reduced ambiguity class is followed by an appended substring that distinguishes it from other classes with the same tag vector but with different frequency vectors. The substring appended to each ambiguity class in the second column from the left includes either the character "D", indicating that there is only one frequency vector for the tag vector, or a number, identifying one of the frequency vectors for the tag vector. For example, the words "house" and "catch" are both ambiguous between NOUN and VERB, but have different frequency vectors, one designated "2" and the other "5". The substring appended to each reduced ambiguity class includes the character "R", indicating it is a reduced class, and a number similarly identifying one of the frequency vectors for the tag vector.

Words can also be assigned a special ambiguity class for unknown words, illustrated in FIG. 15 for the word "Xyz". The tag vector and the frequency vector of this class can be estimated from all words that occur exactly once in the training corpus, based on the assumption that words that occur only once have a similar part-of-speech probability distribution to words that do not occur at all. The tag vector of this class can include, for example, [JJ NN NN$ NNS NP RB VB VBD VBN VBZ].

C.2.b. Producing a Tagging Bimachine

A bimachine consisting of two FSTs can be produced using a training corpus that is hand-annotated with tags such as POS tags. Tags can be selected based on a probabilistic model similar to an HMM. The technique also begins with a lexicon and an unknown word guesser for the tags.

C.2.b.i. Ambiguity Classes

Figure 16:
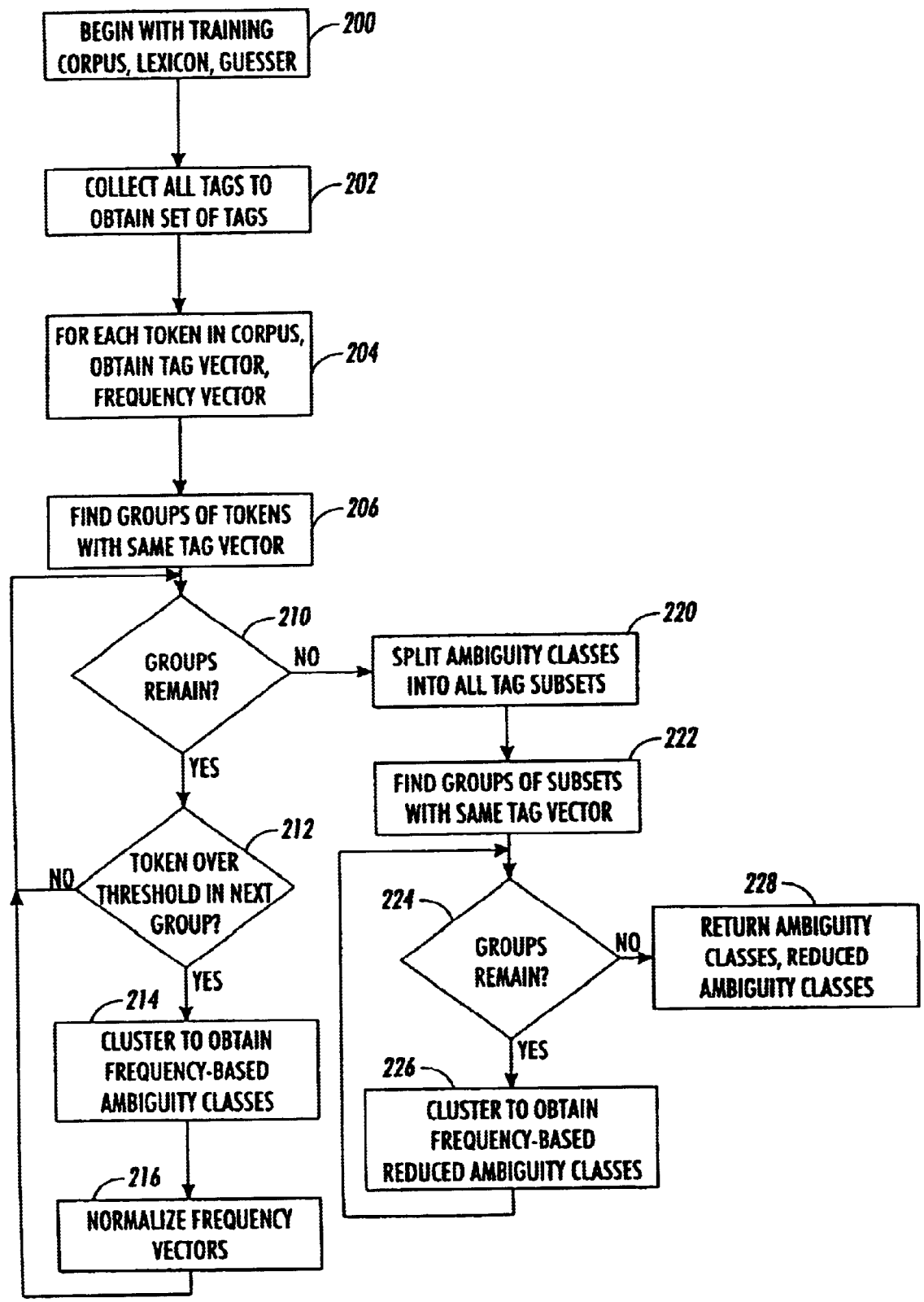
FIG. 16 is a flow chart showing acts in obtaining ambiguity classes and reduced ambiguity classes for a bimachine tagger.

FIG. 16 illustrates how ambiguity classes and reduced ambiguity classes can be obtained. The general acts shown in FIG. 16 have been implemented to be performed automatically by a data processing system.

The act in box 200 in FIG. 16 begins with a training corpus that has been hand-annotated with POS tags in a conventional way, with a conventional lexicon that indicates POS tags for a list of words, and with a conventional guesser for unknown words that can be used on arbitrary words to obtain POS tags. The act in box 202 obtains a set of tags by collecting all POS tags that occur in the training corpus in the lexicon, and in the unknown word guesser.

The act in box 204 begins obtaining ambiguity classes by obtaining a tag vector for each token that occurs in the training corpus. Each token's tag vector includes all tags that are assigned to the word in the training corpus or in the lexicon, and is therefore a raw ambiguity class for the token. In obtaining tag vectors, the act in box 204 can also obtain a frequency vector for each token indicating how often the token occurred with each of its tags in the training corpus.

The act in box 206 uses the tag vectors from box 204 to find all groups of tokens that have identical tag vectors. The act in box 206 can also obtain, for each group, a sum frequency vector indicating how often tokens in the group occur in the training corpus with each of the tags.

The act in box 210 begins an iterative loop that handles each of the groups from box 206. Each iteration begins, in box 212, by determining whether its group includes any tokens with a total frequency greater than a threshold such as one occurrence. If not, the tag vector for the group is an appropriate ambiguity class without further refinement based on frequency vectors, and a numerical identifier can be assigned to the ambiguity class before returning to box 210 to begin the next iteration.

If, on the other hand, one or more tokens in a group occur with greater than threshold frequency, it may be beneficial to divide the group into ambiguity classes based on frequency vectors. Therefore, the act in box 214 clusters the frequency vectors of the tokens with greater than threshold frequency to obtain frequency-based ambiguity classes. Clustering of frequency vectors has been successfully implemented with a centroid method similar to that of Romesburg, H. C., *Cluster Analysis for Researchers,* Malabar, Fla., Krieger Publishing Co., 1989, p. 136, using as distance measure between different clusters a cosine of vectors as described by Salton, G., and McGill, M. J., *Introduction to Modem Information Retrieval,* New York, N.Y., McGraw-Hill, 1983, p. 201. A subgroup of tokens whose frequency vectors cluster together can thus form an ambiguity class having the same tag vector as that of the group but with a frequency vector that is the sum of the frequency vectors of the tokens in the cluster.

The act in box 216 then normalizes frequency vectors of ambiguity classes, adjusting them so that the sum of frequencies in each vector is equal to the real frequency of the class. A normalized frequency vector for an ambiguity class has been successfully obtained, for example, by multiplying each frequency in the class frequency vector by a normalizing ratio. The numerator of the normalizing ratio is the sum of occurrences in the training corpus of tokens in the class, while the denominator is the sum of frequencies in the vector. Normalization will not affect the frequency vectors of refined ambiguity classes from box 214, but it does affect the frequency vector of a default ambiguity class that includes any tokens not clustered in box 214. The default ambiguity class can include low frequency tokens having the group's tag vector, or can be empty if there are no low frequency tokens.

The act in box 216 can also assign a numerical identifier to each of the ambiguity classes before returning to box 210 to begin the next iteration. The default ambiguity class can have an identifier that is distinguishable from the others.

When all the groups from box 206 have been handled, the act in box 220 begins to obtain reduced ambiguity classes (RACs) using the ambiguity classes from box 216. The RACs are the elements of the intermediate strings, exemplified by the third column from left in FIG. 15. The first FST of a bimachine can map from ambiguity classes to RACs, while the second FST can map from RACs to tags. As a result, ambiguity classes are disambiguated in two steps.

The act in box 220 splits all of the ambiguity classes into all possible subsets of tags. If each ambiguity class has a tag vector and a normalized frequency vector, each tag subset split from the ambiguity class can similarly have a tag vector and a frequency vector with appropriate values from the vectors of the ambiguity class. The act in box 222 then uses the tag vectors of the tag subsets to find groups of tag subsets that have the same tag vector. Each of these groups provides a possible RAC. The act in box 222 can also obtain for each group, a sum frequency vector indicating how often tag subsets in the group occur in the training corpus.

The act in box 224 then begins an iterative loop that handles each of the groups from box 222. For each group, the act in box 226 clusters the tag subsets in the groups based on frequency vectors to obtain frequency-based reduced ambiguity classes. The same clustering technique can be used as in box 214. A subgroup of tag subsets whose frequency vectors cluster together can thus form a reduced ambiguity class having the same tag vector as that of the group but with a frequency vector that is the sum of the frequency vectors of the tag subsets in the cluster. The act in box 226 can also assign a numerical identifier to each reduced ambiguity class.

When all the groups from box 222 have been handled, the ambiguity classes and reduced ambiguity classes, together with their numerical identifiers, are returned, in box 228.

C.2.b.ii. Lexical Resources

An appropriate set of lexical resources can be produced using the ambiguity classes from box 228. Lexical resources are necessary to map from tokens to ambiguity classes prior to tagging with the bimachine. Lexical resources can also be used in producing the bimachine, as explained below.

Three lexical resources have been implemented—a corpus lexicon, a converted input lexicon, and a converted guesser for unknown words.

The corpus lexicon can be a finite state network that includes every token in the training corpus received in box 200, concatenated with the numerical identifier of its ambiguity class from box 228. As a result, the corpus lexicon can be accessed with any token in the training corpus to obtain the numerical identifier of the token's ambiguity class.

The input lexicon from box 200 is conventionally an FST that maps a surface form of a token to the same surface form plus a concatenated tag. The input lexicon can readily be converted into a format in which each surface form is instead concatenated with the numerical identifier of one of the ambiguity classes from box 228 that has a tag vector containing the token's alternative tags. This can be done by handling each state of the lexicon network. If a state has one or more outgoing arcs labelled with tags, the arcs labelled with tags are removed, and a new outgoing arc is added labelled with the numerical identifier of the equivalent ambiguity class, and with its destination an arbitrary final state at the end of a branch. If two or more ambiguity classes have the same tag vector, the numerical identifier of the default ambiguity class is selected, because this is the class whose frequency vector is based on all words that are ambiguous between the tags in the vector. If such an ambiguity class does not yet exist, it is created at this time, and the values in its frequency vector are the total frequencies of its tags in the training corpus. The frequency vector is normalized, i.e. adjusted to the real frequency of the hypothetical ambiguity class which may be estimated by a small constant value, such as 0.8.

The unknown word guesser from box 200 is also conventionally an FST that maps a surface form to the same surface form plus a concatenated tag. The unknown word guesser can therefore readily be converted into a format in which each surface form is instead concatenated with the numerical identifier of one of the ambiguity classes from box 228, in the same manner as the input lexicon.

It may also be possible to merge the three lexical resources by a conventional priority union operation. As a result, all strings that can be found on the upper side of the corpus lexicon are removed from the upper side of the converted input lexicon before the two lexicons are unioned. The resulting network contains all words from the corpus lexicon plus all those words from the converted input lexicon that are not in the corpus lexicon, regardless of ambiguity classses. The resulting network could similarly be merged with the converted guesser for unknown words.

Priority union is functionally related to sequentially looking up a string in the lexical resources until one of the resources gives a result. Looking up a string in the unmerged resources, or in a partially merged set of the resources, or in a single resource resulting from a complete merging, should all give the same result.

Two resources should only be merged, however, if the resulting network is not much larger than the sum of the two resources. In practice, merging usually succeeds between the two lexicons, but not between the merged lexicons and the converted guesser for unknown words, which remains unmerged.

C.2.b.iii. FSTs

The ambiguity classes and reduced ambiguity classes from box 228 in FIG. 16 can be the input alphabet and output alphabet, respectively, of a bimachine's first FST, while the reduced ambiguity classes from box 228 and the tags from box 202 can be the input alphabet and output alphabet, respectively, of the bimachine's second FST.

First and second FSTs of a bimachine have both been successfully implemented using an approach similar to the alternative n-type approximation described above, but without using an actual HMM tagger.

In each FST, one state is created for each output symbol, and the state is labelled with its output symbol. In addition, an initial state, not corresponding to any output symbol, is created. All states are final, which would be indicated by a double circle in a representation like that in FIG. 5 above. Because all states are final, the input sequence can end at any point. Each state's label designates a symbol generated immediately before the state was reached. Consequently, the initial state has no label.

From every state, one outgoing arc is created for every input symbol, labelled with the input symbol; the destination of each outgoing arc is a most probable output symbol in the context of the current input symbol that labels the arc and the output symbol that labels the source state. For the first FST, the output symbols are numerical identifiers of reduced ambiguity classes from box 228, and input symbols are numerical identifiers of ambiguity classes from box 228. For the second FST, the output symbols are tags from the set in box 202, and the input symbols are numerical identifiers of reduced ambiguity classes from box 228.

In both FSTs, when the states and arcs have been created, partial prepruning as described above can be performed, to keep the number of different symbol pairs as small as possible. Then all arc labels can be changed from simple symbols into symbol pairs, each with an input symbol and an output symbol. All state labels can be removed. The resulting FST is deterministic but possibly not minimal, so that conventional minimization can also be performed.

The two FSTs differ mainly in the manner in which the most probable output symbol, and hence the destination state, is determined for each arc.

In the successful implementation of a first FST as described above, destination states of arcs were selected as follows:

Taking the ambiguity class $c_i$ of an arc, a probability $p_{T1}(t_{ij}|c_i)$ was computed for every tag $t_{ij}$ in $c_i$. If the source state of the arc is the initial state, this probability depends on the initial position (BEGIN) and on the current ambiguity class $c_i$:5

$$p_{TI}(t_{i,j}) = p(t_{i,j} | \text{BEGIN } c_i) \approx \frac{\pi_{LR}(t_{i,j}) \cdot b^{k_{T1,b}}(t_{i,j} | c_i)}{p^{k_{T1,p}}(t_{i,j})}$$

and if the source state of the arc is a non-initial state, this probability depends on the reduced ambiguity class $r_{i-1}$ labelling the source state of the arc and on the current ambiguity class $c_i$:

$$p_{TI}(t_{i,j}) = p(t_{i,j} | \text{BEGIN } c_i) \approx \frac{a_{LR}(t_{i,j} | r_{i-1}) \cdot b^{k_{T1,b}}(t_{i,j} | c_i)}{p^{k_{T1,p}}(t_{i,j})}$$

where $\pi_{LR}$, $a_{LR}$, and b can have values as explained below. The coefficients $k_{T1,b}$ and $k_{T1,p}$, shown respectively as exponents of b and p, can be given values to appropriately weight the influences of b and p relative to each other and to the probabilities $\pi_{LR}$ and $a_{LR}$, to improve tagging accuracy. Optimal values for the coefficients can be found by experimentation.

The probability $p(t_{ij})$ appearing in the denominator of both equations can be estimated from the frequency of the tag $t_{ij}$ relative to the size of the training corpus. This can be expressed as $$p(t_{i,j}) = \frac{f_{cnt}(t_{i,j})}{\text{corpus size}}$$

where $f_{cnt}(\ )$ denotes a frequency that is directly counted from the training corpus.

The left-to-right initial probability $\pi_{LR}(\ )$ of a tag can be estimated from the training corpus by taking the ratio of the frequency of the tag at sentence beginnings to the total number of sentence beginnings. This can be expressed as $$\pi_{LR}(t_{i,j}) = \frac{f_{cnt}(\text{BEGIN } t_{i,j})}{f_{cnt}(\text{BEGIN})}$$

The lexical (or observation symbol) probability $b(\ )$, also referred to as class probability, of a tag in the context of the current ambiguity class $c_i$ can also be estimated from the training corpus by taking the ratio of the frequency with which the tag occurs as an instance of the class to the total number of occurrences of the class. This can be expressed as $$b(t_{i,j} | c_i) = \frac{f_{cnt}(c_i t_{i,j})}{f_{cnt}(c_i)}$$

where $t_{ij} \in c_i$.

The left-to-right transition probability $a_{LR}()$ of a tag in the context of the previous reduced ambiguity class $r_{i-1}$ can be estimated as follows:

$$a_{LR}(t_{i,j} \mid r_{i-1}) = \sum_k a_{LR}(t_{i,j} \mid t_{i-1,k}) \cdot b(t_{i-1,k} \mid r_{i-1})$$

$$= \frac{1}{f_{hyp}(r_{i-1})} \cdot \sum_k \frac{f_{cnt}(t_{i-1,k} t_{i,j}) \cdot f_{hyp}(r_{i-1} t_{i-1,k})}{f_{cnt}(t_{i-1,k})}$$

where $t_{ij} \in c_i$ and $t_{i-1,k} \in r_{i-1}$. While $f_{cnt}$ denotes a frequency counted directly from the training corpus, $f_{hyp}$ denotes a hypothetical frequency estimated from other frequencies; specifically, the hypothetical frequency of a reduced ambiguity class can be the appropriate normalized frequency from the frequency vector for an ambiguity class from which the reduced ambiguity class can be obtained. Since reduced ambiguity classes cannot be observed directly from the training corpus, all frequencies related to reduced ambiguity classes are initially hypothetical.

Each tag $t_{ij}$ in the ambiguity class $c_i$, together with its probability $p_{T1}$, can be loaded into a matrix within which tags could be sorted by probability, so that $t_{i,1}$ is the most probable tag in the matrix. Some less probable tags can be removed from the matrix, such as by applying thresholds relative to the most probable tag. In the implementation, any tag with a probability greater than or equal to the product of $p_{T1}(t_{i,1})$ with an upper threshold $\tau_{upper}$ remains in the matrix, while any tag with a probability below the product of $p_{T1}(t_{i,1})$ with a lower threshold $\tau_{lower}$ is removed from the matrix. Tags with probabilities between the two probability-threshold products are removed from the matrix if they are easier to disambiguate from left to right, i.e. by the first FST of the bimachine, than from right to left, i.e. by the second FST. The thresholds can be chosen based on their effectiveness in dividing tags into three appropriate groups.

The implementation determines the direction from which a tag is easier to disambiguate based on a comparison with more probable tags in the matrix that have not been removed. The comparison is based on left and right context vectors and on the observation that the ease with which two tags can be distinguished varies with the difference between their context vectors. In other words, it the left context vectors of the tags are more different from each other than the right context vectors, then the tags are easier to disambiguate from left to right than from right to left. Taking the cosine of vectors as an inverse measure of distance in accordance with Salton and McGill, cited above, this condition can be expressed as $$\cos(\vec{f}_{LR}(t_k), \vec{f}_{LR}(t_j)) < \cos(\vec{f}_{RL}(t_k), \vec{f}_{RL}(t_j))$$

in which the two tags are $t_j$ and $t_k$ and the left and right context vectors of a tag $t_i$ can be defined as bigram frequency vectors obtained by counting tag bigrams from the corpus, in the conventional manner:

$$\vec{f}_{LR}(t_i) = \begin{bmatrix} f(t_1 t_i) \\ f(t_2 t_i) \\ \vdots \\ f(t_i t_i) \\ \vdots \end{bmatrix} \text{ and } \vec{f}_{RL}(t_i) = \begin{bmatrix} f(t_i t_1) \\ f(t_i t_2) \\ \vdots \\ f(t_i t_i) \\ \vdots \end{bmatrix}.$$

The implementation thus determines whether to remove a tag $t_j$ from the matrix by comparing it with the more probable tags $t_k$ in accordance with the following condition:

$$k_{LR} \cdot \sum_{k=1}^{j-1} \cos(\vec{f}_{LR}(t_k), \vec{f}_{LR}(t_j)) > \sum_{k=1}^{j-1} \cos(\vec{f}_{RL}(t_k), \vec{f}_{RL}(t_j))$$

where the coefficient $k_{LR}$ can be set to a value that obtains an appropriate relative weighting between left and right contexts. The tag is removed from the matrix if the above condition is true.

When less probable tags have been removed as described above, the reduced matrix can be split into a reduced tag vector and a reduced probability vector, both of which relate to the same ambiguity class $c_i$. The reduced vectors are subsets of the ambiguity class' tag vector and probability vector and can be used to find a closest one of the reduced ambiguity classes from box 228. The implementation first finds all reduced ambiguity classes that have the same tag vector, and then chooses the reduced ambiguity class whose frequency vector is closest to the reduced probability vector. The cosine of vectors of Salton and McGill, cited above, provides a distance measure that can be used to compare the vectors.

The chosen reduced ambiguity class $r_i$ is treated as most probable in the context of the current ambiguity class $c_i$ and the previous reduced ambiguity class $r_{i-1}$. The state labelled with reduced ambiguity class $r_i$ becomes the destination state of the arc labelled with ambiguity class $c_i$ that has a source state labelled with reduced ambiguity class $r_{i-1}$.

A first FST produced in this way maps any sequence of ambiguity classes from left to right, unambiguously and sequentially, i.e. without backtracking, to a sequence of reduced ambiguity classes.

In the successful implementation of a second FST as described above, destination states of arcs were selected as follows:

Taking the reduced ambiguity class $r_i$ of an arc, a probability $p_{T2}(t_{ij})$ was computed for every tag $t_{ij}$ in $r_i$. If the source state of the arc is the initial state, this probability depends on the current reduced ambiguity class $r_i$ and on the sentence-final position (END):

$$p_{T2}(t_{i,j}) = p(t_{i,j} \mid r_i \text{ END}) \approx \frac{\pi_{RL}(t_{i,j}) \cdot b^{k_{T2,b}}(t_{i,j} \mid r_i)}{p^{k_{T2,p}}(t_{i,j})}$$

and if the source state of the arc is a non-initial state, this probability depends on the current reduced ambiguity class ri and on the following tag $t_{i+1}$:

$$p_{T2}(t_{i,j}) = p(t_{i,j} \mid r_i t_{i+1}) \approx \frac{a_{RL}(t_{i,j} \mid t_{i+1}) \cdot b^{k_{T2,b}}(t_{i,j} \mid r_i)}{p^{k_{T2,p}}(t_{i,j})}$$

where $\pi_{RL}$, $a_{RL}$, and b can have values as explained below and where $t_{i+1}$ is the tag labelling the source state of the arc; although $t_{i+1}$ is the previous tag relative to the second FST, it is the following tag relative to an output string of tags because the second FST maps from right to left. The coefficients $k_{T2,b}$ and $k_{T2,p}$, shown as exponents of b and p, respectively, can be given values to appropriately weight the influence of b and p relative to $\pi_{RL}$ and $a_{RL}$, to improve tagging accuracy. As noted above, optimal values for the coefficients can be found by experimentation.

The right-to-left initial probability (or final probability relative to the input and output sequence) $\pi_{RL}()$ of a tag can be estimated from the training corpus by taking the ratio of the frequency of the tag at sentence endings to the total number of sentence endings. This can be expressed as $$\pi_{RL}(t_{i,j}) = \frac{f_{cnt}(t_{i,j}\text{END})}{f_{cnt}(\text{END})}.$$

The lexical (or observation symbol) probability b( ), also referred to as class probability, of a tag in the context of the current reduced ambiguity class $r_i$ can also be estimated from the training corpus by taking the ratio of the frequency with which the tag occurs as an instance of the reduced ambiguity class to the total number of occurrences of the reduced ambiguity class. This can be expressed as $$b(t_{i,j}|r_i) = \frac{f_{cnt}(r_i t_{i,j})}{f_{cnt}(r_i)}$$

where $t_{ij} \in r_i$. To make it possible to count these frequencies directly from the training corpus, the training corpus can be annotated with ambiguity classes from the lexical resources, i.e. the corpus lexicon, the converted input lexicon, and the converted guesser for unknown words. Then, the first FST can be applied to the string of ambiguity classes for every sentence, producing strings of reduced ambiguity classes. Then co-occurrence frequencies $f_{cnt}(r_i,t_{ij})$ referring to the reduced ambiguity classes and to the tags originally contained in the training corpus can be counted.

The right-to-left transition probability $a_{RL}(\ )$ of a tag in the context of the following tag $t_{i+1}$ can be estimated as follows:

$$a_{RL}(t_{i,j}|t_{i+1}) = \frac{f_{cnt}(t_{i,j}t_{i+1})}{f_{cnt}(t_{i+1})}.$$

When probabilities have been estimated for all tags in the current reduced ambiguity class, the implementation selects the tag with the highest probability $p_{T2}(t_{ij})$ as the most probable tag in the context of the current reduced ambiguity class $r_i$ and the following tag $t_{i+1}$. The state labelled with the most probable tag is made the destination state of the arc labelled with reduced ambiguity class $r_i$ that has a source state labelled with tag $t_{i+1}$.

A second FST produced in this way maps any sequence of reduced ambiguity classes from right to left, unambiguously and sequentially, i.e. without backtracking, to a sequence of tags.

C.2.c. A Tagger with a Bimachine

General features of a tagger with a bimachine can be understood from FIG. 3. Processor 62 can be the processor of a workstation or PC, and processor 62 can receive text data 64 from any appropriate source. FSDS 82 can be the bimachine, including both the first and second FSTs, the second FST having a path that represents a string of tag combinations, i.e. reduced ambiguity classes, and a string of tags. Lexical resource 98 can include the corpus lexicon, the converted input lexicon, and the converted guesser for unknown words, unmerged or partially or completely merged, as described above.

Figure 17:
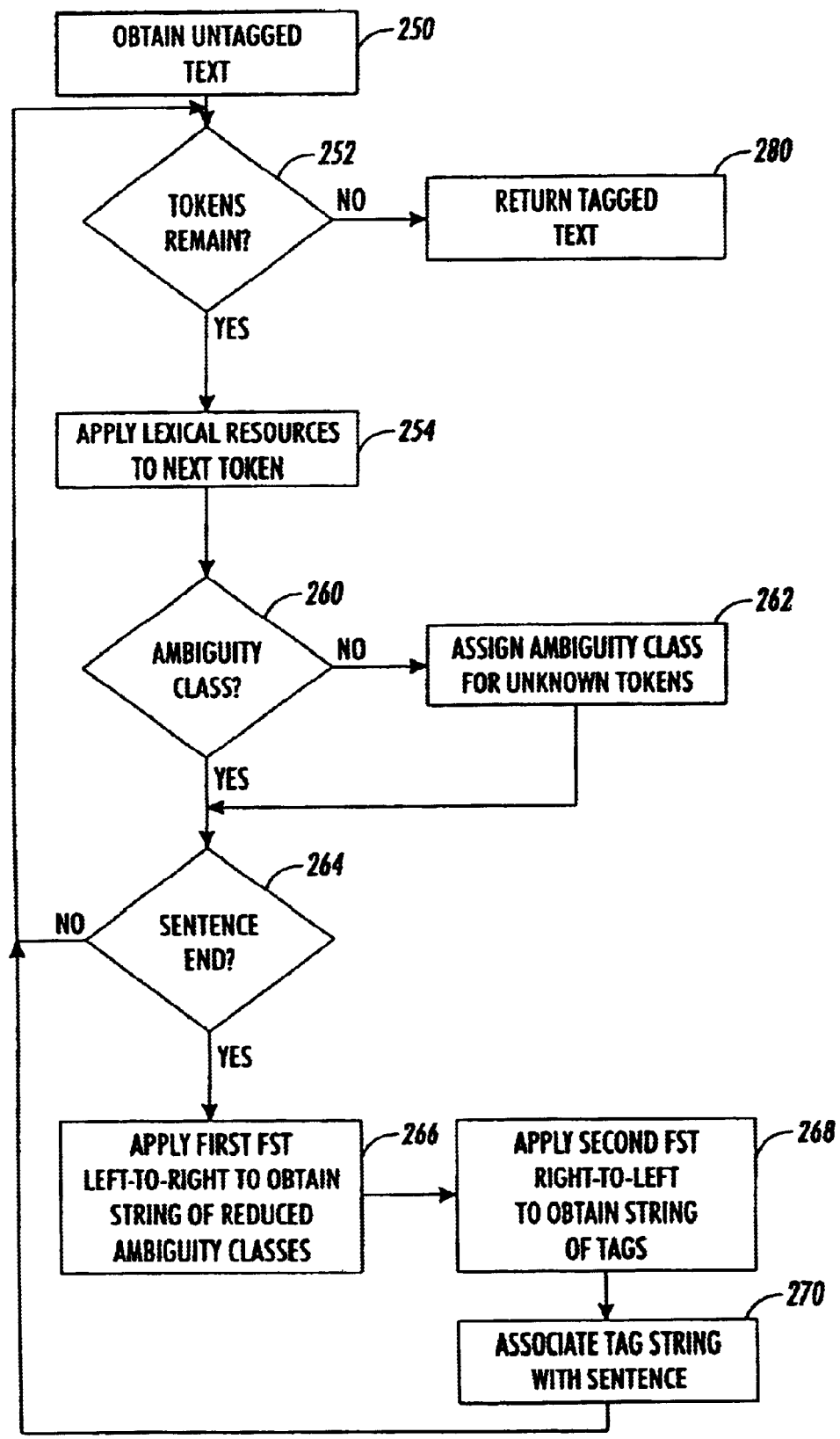
FIG. 17 is a flow chart showing acts in tagging with a bimachine tagger.

FIG. 17 illustrates acts that processor 62 can perform in executing instructions indicated by instruction data 84. The illustrated acts produce a tagged version of an untagged text defined by text data 64.

The act in box 250 begins by obtaining the untagged text. A conventional tokenizer can be applied to the untagged text to obtain the next token, and the act in box 252 can branch on whether the tokenizer has reached the end of the file. If not, the act in box 254 applies the lexical resources to the token returned by the tokenizer. As discussed above, the result of applying the lexical resources should be the same, independent of whether they have been merged, and will either be an ambiguity class or an indication that the token is unknown. In general, the lexical resources are applied as an ordered set, with the corpus lexicon first, the converted input lexicon second, and the converted guesser third. Each resource is applied in sequence until one of them gives a result, after which it is not necessary to apply the subsequent resources. Each of the lexical resources is a sequential FST, meaning that it provides at most one ambiguity class for a token, so that lookup of a token never requires backtracking.

The act in box 260 branches on the result from box 254. If the token is unknown, the act in box 262 assigns an ambiguity class for unknown tokens. As noted, above in relation to FIG. 15, this ambiguity class can have a tag vector and a frequency vector that are estimated from all tokens that occur only once in the training corpus, based on the assumption that such tokens have a probability distribution similar to tokens that do not occur in the training corpus.

The act in box 264 branches based on whether the token has been assigned the ambiguity class for sentence end. If so, a string of ambiguity classes for a sentence has been obtained. But if not, the act in box 252 is performed to obtain another token.

When a string of ambiguity classes for a sentence is complete, the act in box 266 applies the first FST of the bimachine to the string from left-to-right to obtain a string of reduced ambiguity classes. Then the act in box 268 applies the second FST of the bimachine to the string of reduced ambiguity classes from right-to-left to obtain a string of tags. As noted above, both FSTs are sequential, and will map any input sequence unambiguously and sequentially, i.e. without backtracking, to an output sequence.

The act in box 270 associates the tag string with the sentence, such as by outputting them both to a file or other appropriate output device. When the end of the text is reached in box 252, the act in box 280 can return a tagged version of the text from the file. More generally, the implementation can output words, POS tags, ambiguity classes, and reduced ambiguity classes, in any order, and with any separators.

C.2.d. Results of Tagging with a Bimachine

A bimachine tagger as described above has been fully implemented and successfully tested on seven languages—English, Dutch, French, German, Italian, Portuguese, and Spanish. Part-of-speech tags were used. In general, the bimachine tagger had a significantly higher processing speed than a similar HMM tagger, sometimes ten times faster than the HMM tagger. Compared to FST taggers as described above, the bimachine tagger had higher tagging speed, similar accuracy, and significantly lower size of finite state data structure. Thus the bimachine tagger is advantageous in comparison not only with an HMM tagger but also with FST taggers.

The implemented bimachine (BM) tagger has been compared with s-type FST taggers trained on 100,000 (100K) and 1,000,000 (1M) words and with an HMM tagger with the results set forth in Table 5. Table 5 shows, for English, German, and Spanish, tagging speed and accuracy of different taggers and sizes of the BM and s-type FSTs.

The BM tagger showed a tagging speed of 47,600 words/second (w/s) on English, which represents a speed-up factor of 11.6 relative to the HMM tagger that tags 4,110 w/s. For English, German, and Spanish, the BM tagger's average speed of 45,600 w/s was 10.7 times faster than the HMM tagger's average speed of 4,360 w/s. The s-type FST trained on 100K words reached a tagging speed of 24,500 w/s on average, which represents a speed-up factor of 5.6 relative to the HMM tagger. Therefore, applying two sequential FSTs as in the BM tagger can take less time than applying one single nonsequential FST as in the s-type FST tagger.

TABLE 5

Tagging speed and accuracy of taggers, and sizes of finite state data structures

| | Tagger Type | English | German | Spanish | Average |
|---|---|---|---|---|---|
| Tagging speed (K words/sec) | BM | 47.6 | 42.2 | 46.9 | 45.6 |
| | | 11.6 | 11.7 | 8.7 | 10.7 |
| Speed-up factor (relative to HMM) | s-FST (100K) | 25.1 | 20.2 | 28.1 | 24.5 |
| | | 6.1 | 5.6 | 5.2 | 5.6 |

The BM tagger's average tagging accuracy was 96.80% on the test corpus and 98.71% on the training corpus. The HMM tagger's average tagging accuracy was 97.43% on the test corpus and 98.42% on the training corpus. The BM tagger is less accurate than the HMM tagger on the test corpus, but is more accurate on the training corpus. This means that the BM tagger can be more corpus dependent than the HMM tagger. The BM tagger shows similar tagging accuracy to the s-type FST tagger trained on 1M words.

The BM tagger, whose two FSTs together average 546 states and 216,000 arcs, has a smaller finite state data structure than the s-type FST taggers: The s-type FST trained on 100K words averages 2,798 states and 628,000 arcs, while the s-type FST trained on 1M words averages 12,328 states and 2,729,000 arcs.

Table 6 shows tagging speed and accuracy of the BM and HMM taggers on all seven languages. In addition, it gives parameters of the corpora, such as the number of different POS tags and ambiguity classes, and the sizes of the training and test corpora in thousands of words.

TABLE 6

Properties of bimachine and HMM taggers, and parameters of corpra

| | | Engl. | Dutch | Fren. | Germ. | Ital. | Port. | Span. | Avge. |
|---|---|---|---|---|---|---|---|---|---|
| Properties of bimachine and HMM taggers | | | | | | | | | |
| Tagging Speed (K words/sec) | BM | 47.6 | 41.1 | 46.9 | 42.2 | 47.6 | 44.8 | 46.9 | 45.3 |
| | | 11.6 | 13.4 | 9.1 | 11.7 | 8.4 | 9.3 | 8.7 | 10.3 |
| Speed-up factor (relative to HMM) | HMM | 4.11 | 3.06 | 5.18 | 3.62 | 5.66 | 4.84 | 5.36 | 4.55 |
| | | 1.0 | 1.0 | 1.0 | 1.0 | 1.0 | 1.0 | 1.0 | 1.0 |
| Accuracy on test corpus (%) | BM | 96.33 | 93.30 | 98.05 | 96.84 | 94.45 | 94.73 | 97.23 | 95.85 |
| | | 98.92 | 97.43 | 99.01 | 98.16 | 99.01 | 98.29 | 99.06 | 98.55 |
| Accuracy on training corpus (%) | HMM | 96.80 | 94.66 | 98.75 | 97.55 | 95.94 | 97.20 | 97.95 | 96.98 |
| | | 98.49 | 97.47 | 97.82 | 98.16 | 98.13 | 97.28 | 98.61 | 97.99 |
| Parameters of Corpora | | | | | | | | | |
| # Tags | | 76 | 49 | 46 | 67 | 77 | 71 | 56 | 63 |
| # Ambiguity Classes | | 349 | 305 | 321 | 448 | 484 | 341 | 265 | 359 |
| # Reduced Ambiguity Classes | | 724 | 615 | 692 | 732 | 925 | 588 | 465 | 677 |
| Training corpus (K words) | | 20 | 26 | 23 | 91 | 27 | 21 | 16 | 32 |
| Test corpus (K words) | | 20 | 10 | 6 | 40 | 13 | 16 | 15 | 17 |

TABLE 5-continued

Tagging speed and accuracy of taggers, and sizes of finite state data structures

| | Tagger Type | English | German | Spanish | Average |
|---|---|---|---|---|---|
| | s-FST (1M) | 23.3 | 21.1 | 28.2 | 24.2 |
| | | 5.7 | 5.8 | 5.3 | 5.6 |
| | HMM | 4.11 | 3.62 | 5.36 | 4.36 |
| | | 1.0 | 1.0 | 1.0 | 1.0 |
| Accuracy on test corpus (%) | BM | 96.33 | 96.84 | 97.23 | 96.80 |
| | | 98.92 | 98.16 | 99.06 | 98.71 |
| Accuracy on training corpus (%) | s-FST (100K) | 95.05 | 95.80 | 96.87 | 95.91 |
| | | 98.49 | 98.13 | 98.43 | 98.35 |
| | s-FST (1M) | 96.76 | 96.32 | 97.10 | 96.73 |
| | | 98.46 | 96.64 | 98.00 | 97.70 |
| | HMM | 96.80 | 97.55 | 97.95 | 97.43 |
| | | 98.49 | 98.16 | 98.61 | 98.42 |
| # States (1) | BM | 672 | 563 | 402 | 546 |
| # Arcs (K) | ($T_1 + T_2$) | 260 | 271 | 117 | 216 |
| | s-FST (100K) | 4,688 | 2,687 | 1,019 | 2,798 |
| | | 972 | 727 | 185 | 628 |
| | s-FST (1M) | 18,442 | 15,008 | 3,535 | 12,328 |
| | | 3,694 | 3,908 | 586 | 2,729 |
| # Probabilities (1) | HMM | 28,576 | 28,810 | 16,688 | 24,691 |

The tests and results above show that bimachine taggers can achieve significantly higher tagging speed (at the cost of slightly lower tagging accuracy) than HMM taggers, so that bimachine taggers are better able to handle large text corpora, as can occur in information retrieval applications. Compared to s-type FST taggers, bimachine taggers show higher tagging speed, similar accuracy, and significantly lower size of finite state data structures. This means that bimachines are superior to n-type, s-type, and to b-type FST taggers and to HMM taggers in POS tagging.

The bimachine approach described above has other advantages: An extremely small amount of manual effort is required to construct a bimachine when compared with techniques that use hand-written rules. Also, in constrast with single FSTs, a bimachine allows modelling of left and right context dependencies by two separate sequential FSTs. No backtracking is required, which speeds up processing. From a linguistic and probabilistic perspective, some POS tags depend more and are more certain to disambiguate on their left context, and others more on their right context.

C.3. Variations

The implementations described above could be varied in numerous ways within the scope of the invention.

The implementations described above have been successfully executed using Sun workstations running Unix, but implementations could be executed on other machines, such as a PC running Windows™, a Mac running MacOS, or a minicomputer running UNIX.

The implementations described above have been successfully executed from C source code, but other programming environments and platforms could be used.

The implementations described above use part-of-speech tags, but the invention could be implemented for other kinds of tags indicating syntactic characteristics such as phrase type, number, or gender, or indicating semantic characteristics. As mentioned above, for example, syntactic tags could indicate part of speech plus person, number, gender, and other information necessary for inflection, e.g. noun-singular, verb-present-1st person plural, etc. More generally, the invention could be implemented for any types of tag combinations and tags that are interrelated in a way that can be modelled by an HMM or the like.

The implementations described above use particular types of FSTs and bimachines, but the invention could be implemented with other kinds of finite state data structures, including finite state automata equivalent to FSTs and bimachines, and including variations in which data structures have multiple start states or are otherwise modified. Also, any of the FSTs could be converted into a bimachine using conventional techniques.

In general, in the implementations described above, a tag combination string is paired with a tag string along a path such that each tag combination is paired with a tag that is an element of the tag combination, but the invention could also be implemented such that this condition does not hold for every element of a tag combination string.

In general, in the implementations described above, each string of tag combinations is represented by only one path that also represents a highly probable string of tags, but it would also be possible to have more than one path for the same string of tag combinations, with each path representing one of a very small set of highly probable strings of tags, such as no more than two or three strings; in this case, all of the strings of tags could be provided as the result of disambiguation or one could be selected in any appropriate way. In addition, for various purposes such as detection of copying, a finite state data structure could include at least some paths that do not represent highly probable strings of tags.

In the implementations described above, a string of tag combinations for a sentence is paired with a string of tags for the sentence, but strings of tag combinations for other text elements could be pairs with tags, such as for a paragraph, a clause, or any other text unit.

The FST taggers described above approximate first order HMMs, but, as noted above, second order HMMs could also be approximated, as could any other appropriate type of HMM, and FST taggers could also be implemented without approximating HMMs.

The bimachine taggers described above employ reduced ambiguity classes obtained in a particular way, and are produced using a particular method. The invention could also be implemented with intermediate elements other than reduced ambiguity classes, and reduced ambiguity classes could be obtained in other ways. Also, a bimachine could be produced in other ways rather than as a pair of FSTs as described above, including the technique described by Roche and Schabes, cited above.

The implementations described above obtain ambiguity classes using specified lexical resources, but ambiguity classes could be obtained using other types of lexical resources or in other ways.

The implementations described above are for seven natural languages, as indicated, but the invention could be implemented for any other suitable language.

In the implementations described above, specific acts are performed that could be omitted or performed differently.

In the implementations described above, acts are performed in an order that could be modified in many cases. For example, in FIG. 17, each sentence could be output with its tags rather than storing each sentence and returning the complete tagged text.

The implementations described above use currently available computing techniques, but could readily be modified to use newly discovered computing techniques as they become available.

D. Applications

Finite state data structures as described above could be produced and used in any application in which elements of written or spoken language are tagged, especially those applications that are especially amenable to finite state techniques or to the use of HMMs, such as corpus analysis, speech recognition, etc. As noted above, the techniques could be used to increase processing speed of tools that depend on tagging.

E. Miscellaneous

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. An article of manufacture for use in tagging text in a language, comprising:

a storage medium;

machine-accessible tagging data stored by the storage medium; the tagging data including a finite state data structure for use in mapping strings of tag combinations to strings of tags for tokens in the language, each tag combination being a combination of tags for tokens in the language; the finite state data structure including paths that represent pairs of strings with a first string that is a string of tag combinations and a second string that is a string of tags; the second strings of at least one set of one or more paths with the same first string including only highly probable strings of tags for the first string; paths that represent pairs of strings being machine accessible using the first string to obtain the second string.

2. The article of claim 1 in which the finite state data structure is a finite state transducer.

3. The article of claim 2 in which the finite state transducer is produced by:

(A) obtaining a first set that includes possible tags for tokens in the language and a second set that includes tag combinations, each tag combination in the second set including one or more tags in the first set; and (B) using the first and second sets to produce the finite state transducer.

4. The article of claim 3 in which (B) includes:

(B1) creating a third set that includes an initial state and, for each pair of a tag combination in the second set with a tag in the first set, a state labelled with the pair; and (B2) for each state in the third set and for each tag combination in the second set, determining a destination state in the third set and creating an outgoing arc from the state to the destination state in the third set, labelled with the pair label of the destination state; the destination state being the state whose pair label is the most probable for the tag combination according to a Hidden Markov Model (HMM) that maps sequences of ambiguity classes to tags for the language.

5. The article of claim 4 in which (B2) includes:
if the state is the initial state, determining the pair label that is most probable using $$\operatorname*{argmax}_{k} p_1(c_i, t_{ik}) = \pi(t_{ik}) \cdot b(c_i | t_{ik})$$

where $\pi$ is initial probability according to the HMM, and b is class probability for the tag combination of the pair label according to the HMM.

6. The article of claim 4 in which (B2) includes:
if the state is not the initial state, determining the pair label that is most probable using $$\operatorname*{argmax}_{k} p_2(c_i, t_{ik}) = a(t_{ik} | t_{previous}) \cdot b(c_i | t_{ik})$$

where a is transition probability according to the HMM, and b is class probability for the tag combination of the pair label according to the HMM.

7. The article of claim 3 in which (B) includes:
(B3) minimizing and determinizing the finite state transducer.

8. The article of claim 3 in which (B) includes:
(B4) using the first set and the second set to obtain possible preceding subsequences up to a given look-back length and possible following subsequences up to a given look-ahead length and to obtain a third set that includes, for every tag combination, every sequence in which the tag combination is preceded by one of the possible preceding subsequences and followed by one of the possible following subsequences; each preceding and following subsequence including one or more elements, each element including a tag combination in the second set or a tag in the first set;
(B5) modifying each sequence in the third set to include a combination-tag pair that includes the sequence's tag combination and that includes a tag that is the most probable for the tag combination to be preceded by the sequence's preceding subsequence and to be followed by the sequence's following subsequence according to a Hidden Markov Model (HMM) that maps sequences of ambiguity classes to tags for the language;
(B6) combining the modified sequences in the third set to produce a preliminary finite state transducer that accepts any of the modified sequences; and
(B7) obtaining one or more constraint finite state machines representing constraints and composing the constraint finite state machines with the preliminary finite state transducer to produce the finite state transducer; the constraints including constraints for tags, combinations and sentence boundaries and ensuring a correct concatenation of sequences.

9. The article of claim 2 in which the finite state transducer is produced by:
(C) obtaining a first partial set that includes tag combination sequences ending with a tag combination with only one tag, the first partial set not including all possible tag combination sequences that end with a tag combination with only one tag;

(D) using the first partial set to obtain a second partial set that includes a combination-tag pair sequence for each tag combination sequence in the first partial set, each combination-tag pair in each sequence in the second partial set including a tag combination and a tag for the tag combination; the tags for a tag combination sequence in the first partial set being obtained using a Hidden Markov Model (HMM) that maps sequences of ambiguity classes to tags for the language; and
(E) using the second partial set to obtain a finite state transducer that maps tag combinations to tags and that approximates the HMM.

10. The article of claim 9 in which (C) includes:
obtaining a first set that includes possible tags for tokens in the language and a second set that includes tag combinations, each tag combination in the second set including one or more tags in the first set; and
using the first and second sets to obtain all possible combination-tag pair sequences up to a sequence length.

11. The article of claim 9 in which (C) includes:
annotating an untagged text corpus with tag combination labels; and
extracting tag combination sequences from the annotated text corpus.

12. The article of claim 9 in which (E) includes:
obtaining a preexisting finite state transducer that approximates the HMM;
using the preexisting finite state transducer to obtain a complete set that includes combination-tag pair sequences, the complete set including a combination-tag pair sequence for each tag combination sequence that can be mapped by the preexisting finite state transducer,
combining the complete set and the second partial set of combination-tag pair sequences to obtain a combined set of combination-tag pair sequences; and
using the combined set of combination-tag pair sequences to produce the finite state transducer.

13. The article of claim 12 in which the preexisting finite state transducer has arcs labelled with combination-tag pairs and in which the complete set is obtained by extracting all combination-tag sequences from the preexisting finite state transducer.

14. The article of claim 1 in which the finite state data structure is a finite state bimachine that includes first and second finite state transducers;
the first finite state transducer including paths that represent pairs of strings of tag combinations, each pair of strings including first and second strings of equal length, each tag combination in the first string having a counterpart tag combination in the second string; at least one tag combination in the first string of a pair in the first finite state transducer including two or more tags, the counterpart tag combination in the second string being a subset of the tag combination in the first string;
the second finite state transducer including paths that represent pairs of strings of equal length, each pair of strings including a first string that is a string of tag combinations and a second string that is a string of tags, each tag combination in the first string having a counterpart tag in the second string; at least one tag combination in the first string of a pair of strings in the second finite state transducer including two or more tags, the counterpart tag in the second string being one of the tags in the first string; the second string of each path in the first finite state transducer being the first string of a path in the second finite state transducer.

15. The article of claim 1 in which the first and second strings of a pair of strings are of equal length, each tag combination in the first string having a counterpart tag in the second string; at least one tag combination in the first string including two or more tags, the counterpart tag in the second string being one of the tags in the tag combination.

16. The article of claim 1 in which each tag is a part-of-speech tag identifying a part of speech of the language and each tag combination is a combination of the part-of-speech tags.

17. The article of claim 1 in which each first string is represented by only one path, each first string's path also representing one highly probable string of tags for the first string.

18. A machine for use in tagging text in a language, comprising:

a finite state data structure for use in mapping strings of tag combinations to strings of tags for tokens in the language, each tag combination being a combination of tags for tokens in the language; the finite state data structure including paths that represent pairs of strings with a first string that is a string of tag combinations and a second string that is a string of tags; the second strings of at least one set of one or more paths with the same first string including only highly probable strings of tags for the first string; paths that represent pairs of strings being machine accessible using the first string to obtain the second string; and a processor connected for accessing the finite state data structure; the processor operating to:

obtain a text that includes a string of tokens in the language;

use the text to obtain a string of tag combinations that is the first string of one of the paths of the finite state data structure, the string of tag combinations being obtained by obtaining, for each token in the string of tokens, a tag combination; and access the finite state data structure using the string of tag combinations to obtain the second string of the path, the second string being a string of tags for the string of tokens.

19. A method carried out in a system that includes tagging data for use in tagging text in a language; the tagging data including:

a lexical resource that can be accessed with a token to obtain a tag combination that includes tags the token can have in the language;

a finite state data structure for use in mapping strings of tag combinations to strings of tags for tokens in the language, each tag combination being a combination of tags for tokens in the language; the finite state data structure including paths that represent pairs of strings with a first string that is a string of tag combinations and a second string that is a string of tags; the second strings of at least one set of one or more paths with the same first string including only highly probable strings of tags for the first string; paths that represent pairs of strings being machine accessible using the first string to obtain the second string;

the method comprising:

until a sentence's end is reached, performing a series of iterations, each handling a token in the text; each iteration after a first iteration handling a token that follows the token of the preceding iteration; each iteration using the iteration's token to access the lexical resource and obtain the token's tag combination; the series of iterations producing a string of tag combinations that is the first string of one of the paths in the finite state data structure;

using the string of tag combinations to access the finite state data structure to obtain the path's second string, the second string being a string of tags for the sentence.

20. A method of operating a first machine to transfer data to a second machine over a network, the second machine including a memory and a processor connected for accessing the memory; the method comprising:

establishing a connection between the first and second machines over the network; and operating the first machine to transfer a finite state data structure for use in tagging text in a language to the memory of the second machine; the finite state data structure mapping strings of tag combinations to strings of tags for tokens in the language, each tag combination being a combination of tags for tokens in the language; the finite state data structure including paths that represent pairs of strings with a first string that is a string of tag combinations and a second string that is a string of tags; the second strings of at least one set of one or more paths with the same first string including only highly probable strings of tags for the first string; paths that represent pairs of strings being machine accessible using the first string to obtain the second string.

* * * * *